United States Patent
Takahashi et al.

(10) Patent No.: US 7,182,426 B2
(45) Date of Patent: Feb. 27, 2007

(54) ROTOR, DRIVE CONVERSION DEVICE, CLEANING DEVICE, WIPING DEVICE, AND LIQUID INJECTION DEVICE

(75) Inventors: Masaru Takahashi, Nagano-ken (JP); Hiroyuki Ito, Nagano-ken (JP); Seiji Tojo, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 71 days.

(21) Appl. No.: 10/502,585

(22) PCT Filed: Jul. 8, 2003

(86) PCT No.: PCT/JP03/08676

§ 371 (c)(1),
(2), (4) Date: Jul. 27, 2004

(87) PCT Pub. No.: WO2004/005033

PCT Pub. Date: Jan. 15, 2004

(65) Prior Publication Data

US 2005/0103894 A1    May 19, 2005

(30) Foreign Application Priority Data

| Jul. 8, 2002 | (JP) | ............... | 2002-199048 |
| Mar. 7, 2003 | (JP) | ............... | 2003-061901 |
| Mar. 31, 2003 | (JP) | ............... | 2003-096643 |
| Jun. 19, 2003 | (JP) | ............... | 2003-175440 |
| Jun. 26, 2003 | (JP) | ............... | 2003-183294 |

(51) Int. Cl.
*B41J 2/165* (2006.01)

(52) U.S. Cl. .......................... 347/29; 347/30

(58) Field of Classification Search ............ 347/22–35
See application file for complete search history.

(56) References Cited

U.S. PATENT DOCUMENTS

| 6,578,948 B2 * | 6/2003 | Shima .................... 347/29 |
| 6,695,430 B2 * | 2/2004 | Arai et al. ............... 347/29 |
| 2002/0067388 A1 | 6/2002 | Shimizu et al. |

FOREIGN PATENT DOCUMENTS

| EP | 1010535 A2 | 6/2000 |
| JP | 54-15655 | 2/1979 |
| JP | 57-073264 | 5/1982 |
| JP | 57-73264 A | 5/1982 |
| JP | 57-150653 | 9/1982 |
| JP | 4-92114 A | 3/1992 |
| JP | 6-50406 A | 2/1994 |
| JP | 09-112647 | 5/1997 |
| JP | 2000-153617 A | 6/2000 |

(Continued)

*Primary Examiner*—Shih-Wen Hsieh
(74) *Attorney, Agent, or Firm*—Sughrue Mion, PLLC

(57) ABSTRACT

A nozzle protecting device 30 of an ink jet type recording apparatus has a cap 46 which covers nozzles of a recording head and a cap support member 47 which is connected to the cap 45 via a spring member 80. The distance between the cap 46 and the cap support member 47 can be changed by elastic deformation of the spring member 80. A vent hole 54 is formed in the cap 46. A valve seat 56 which covers the terminal portion of the vent hole 54 is provided. A valve body 58 is rotatably attached to the lower portion of the cap 46. The valve body 58 selectively abuts on and parts from the valve seat 56 in accordance with the distance between the cap 46 and the cap support member 47. As a result, the inside of the cap 46 is opened and closed to air via the vent hole 54.

18 Claims, 23 Drawing Sheets

FOREIGN PATENT DOCUMENTS

| | | |
|---|---|---|
| JP | 2000-179641 A | 6/2000 |
| JP | 2001-353860 A | 12/2001 |
| JP | 2002-36578 A | 2/2002 |
| JP | 2002-225299 | 8/2002 |
| JP | 2002-225299 A | 8/2002 |
| JP | 2002-234194 A | 8/2002 |
| JP | 2002-264350 A | 9/2002 |
| JP | 2002-265076 | 9/2002 |
| JP | 2003-222224 A | 8/2003 |

* cited by examiner

ROTOR, DRIVE CONVERSION DEVICE, CLEANING DEVICE, WIPING DEVICE, AND LIQUID INJECTION DEVICE

FIELD OF THE INVENTION

The present invention relates to a rotor, a drive converting apparatus, a cleaning apparatus, a wiping apparatus and a liquid ejection apparatus that have these apparatuses.

BACKGROUND OF THE INVENTION

As a conventional liquid ejection apparatus which ejects a liquid on to a target, there is, for example, an ink jet type printer which prints an image or the like by ejecting ink droplets on to a page. This type of printer has a carriage member having a recording head and a platen which supports a target, for example, paper. The recording head has a plurality of nozzles which eject inks. Paper is guided between the recording head and the platen and inks are ejected onto the paper from the nozzles. This printer is generally provided with a cleaning apparatus to clean the nozzles in order to prevent ink clogging in the nozzles. The cleaning apparatus includes a cap apparatus having a cap which covers the recording head, a tube pump to be connected to the cap apparatus and a wiping apparatus having a wiping member for cleanly wiping inks adhered to the recording head. The wiping apparatus wipes the recording head clean by causing the wiping member to slide in contact with the recording head.

The cleaning operation of the printer will be described in detail. First, after the carriage is moved to a position at which the recording head faces the cap apparatus, the recording head is covered tightly with the cap. Subsequently, the tube pump is driven to suck out the inks, which become highly viscous and may cause clogging in the nozzles, together with air inside the cap and discharge the inks outside the nozzles. While the tube pump is driven, the wiping member is placed at a predetermined position where the recording head can be wiped. When the suction of the tube pump is finished, the cap is moved downward after which the carriage is moved to cause the recording head to slide in contact with the wiping member, thereby wiping the recording head.

In such a cleaning apparatus, a drive source for driving the cap apparatus, the tube pump and the wiping apparatus is common for making the printer compact. As compared with the driving of the tube pump, however, the cap apparatus and the wiping apparatus are driven only for a short period of time and their timings differ. Therefore, the tube pump is constructed to be driven on the drive force directly received from the drive source, whereas the cap apparatus and the wiping apparatus are driven via a drive converting apparatus using part of the drive force from the drive source. (See, for example, Japanese Laid-Open Patent Publication No. 2000-153617 and Japanese Laid-Open Patent Publication No. 2002-225299.) Those publications disclose printers that use a drive converting apparatus which drives the tube pump and wiping member with a single motor.

In Japanese Laid-Open Patent Publication No. 2000-153617, for example, a pump wheel to drive the tube pump is arranged on one side of a gear to which the drive force of the motor is transmitted. As the gear rotates, the pump wheel rotates with the rotation of the motor to thereby drive the tube pump. Meanwhile, the wiping apparatus is arranged on the other side of the gear via a friction clutch as the drive converting apparatus. The drive force of the motor is transmitted to the wiping apparatus via the friction clutch, moving the wiping member to a predetermined position. The friction clutch is operated intermittently with respect to the driving of the tube pump.

In case of the publication described above, the drive force of the motor is transmitted to the wiping apparatus by the friction clutch alone. In the case where inks are adhered to a driven gear and the friction clutch, for example, the weights of the parts to be driven, i.e., the driven gear and the friction clutch, increase because of the adhered inks. Therefore, the frictional force needed to drive the wiping apparatus becomes greater so that even when the drive force of the motor is transmitted to the friction clutch, the wiping apparatus cannot be driven.

Japanese Laid-Open Patent Publication No. 2002-225299 discloses the printer which is provided with a drive shaft to drive the tube pump and the wiping apparatus. The drive shaft penetrates the center of the pump wheel of the tube pump. The tube pump is driven as the pump wheel is directly rotated according to the rotation of the drive shaft. The wiping apparatus has a first drive mechanism including a sun gear, a cleaner drive lever, a gear holding lever and a planetary gear which constitutes the drive converting apparatus, and a second drive mechanism different from the first drive mechanism. The drive shaft is fitted into the center of the sun gear. As the drive shaft rotates, the second drive mechanism is driven via the sun gear, positioning the wiper to a predetermined position. The first drive mechanism functions to intermittently operate the wiping apparatus with respect to the driving of the tube pump. Therefore, the drive converting apparatus in Japanese Laid-Open Patent Publication No. 2002-225299, unlike that in Japanese Laid-Open Patent Publication No. 2000-153617 can drive the wiping apparatus even if inks are adhered to those parts to be driven.

There was a case where printing defects would occur due to an increase in the viscosity of the ink caused by evaporation of a solvent, such as water, from the openings of the nozzles, adhesion of dust to the openings of the nozzles and mixing of bubbles in the ink caused by replacement of a cartridge, or the like.

To maintain the performance of the nozzles in the best condition, therefore, a nozzle protecting device equipped with the cap, which covers the nozzles of the recording head and the tube pump that sucks out ink, and bubbles or so in the cap covering the nozzles, is used. In the case where printing is not carried out over a long period of time, the nozzles are covered with the cap, thus preventing the ink from becoming dry. As needed, the tube pump is driven with the nozzles covered with the cap, setting the inside of the cap to a negative pressure, so that the ink whose viscosity is increased or bubbles or the like generated in the recording head by replacement or the like of the cartridge is discharged to the ink tank, thereby maintaining the performance of the nozzles in good condition.

If the tube pump is driven to set the inside of the cap to a negative pressure as mentioned above, the inks flow into the cap via the recording head and fill the inside of the cap. As those inks would become unnecessary at the time of performing printing, so-called air suction was performed to exhaust the inks into the ink tank by the tube pump while taking air inside the cap. Taking air inside the cap was executed while slightly separating the cap from the nozzles.

Recently, the sizes of ink jet type recording apparatuses (printers) are becoming rapidly smaller and demand for a greater degree of freedom for locating recording apparatuses is increasing. Recording devices are increasingly used in a state other than in a horizontal state, and if air suction is carried by the above-described method under such a usage, the inks would leak from the cap in the instant the cap is separated from the nozzles. As a result, the inside of the recording apparatus becomes dirty.

To ensure air suction even if the recording apparatus is placed in a state other than a horizontal state, therefore, air release means which causes the cap to communicate with air as needed while covering the nozzles is provided. The air release means can release the inside of the cap to air before the cap is separated from the nozzles, so that the inks can be exhausted outside without causing ink leakage.

One example of the nozzle protecting device having an air release means comprises a tube to communicate inside the cap with air and a valve which opens and closes the end portion of the tube. The nozzle protecting device is of a slide type whose slider elevates up and down as the carriage moves in the scan direction so that the cap covers the nozzles as it elevates according to the elevation of the slider. The opening/closing of the valve is executed according to the operation of the carriage in the scan direction and air is taken inside the cap as needed.

However, such air release means needs the tube suitable located and thus makes the structure of the nozzle protecting device complicated. Further, after the valve is opened or closed by the movement of the carriage, the inks inside the cap are exhausted by the tube pump. Therefore, the first drive means which drives the carriage and the second drive means which drives the tube pump should be driven separately, complicating the structure.

The slide type nozzle protecting device makes the space for the carriage in the scan direction larger, which is a factor to enlarge the device. Recently, therefore, an up/down movement type which can make the space smaller is becoming mainstream as compared with the slide type. For example, Japanese Laid-Open Patent Publication No. 2002-36578 discloses an up/down movement type nozzle protecting device provided with an air release valve.

The nozzle protecting device has a multi-stage rotary cam having a plurality of cams on the same shaft. The multi-stage rotary cam has a first cam to elevate the cap, a second cam to open and close an air communication valve as an air release means and a motor. As the drive force of the motor is transmitted to the multi-stage rotary cam and the gear of the tube pump, elevation of the cap, the opening/closing of the air communication valve and driving of the pump gear are carried out. And, the air communication valve is opened or closed with the cap covering the nozzles, after which the pump gear is driven to perform air suction.

The operations of the cap and the air communication valve have nothing to do with the movement of the carriage, and the cap, the air communication valve and the pump gear can be driven to perform air suction with a single motor, thereby simplifying the device.

While the nozzle protecting device disclosed in Japanese Laid-Open Patent Publication No. 2002-36578 is made simpler, however, it needs larger space for the multi-stage rotary cam so that the ink jet type recording apparatus is larger.

The drive converting apparatus disclosed in Japanese Laid-Open Patent Publication No. 2002-225299 is comprised of many parts. Accordingly, a heavy load is applied to the drive shaft that drives the wiping apparatus and the tube pump.

That is, a large drive force is needed to drive the wiping apparatus and the tube pump more reliably. Generation of large drive force requires the use of a larger motor. As size reduction of the drive converting apparatus, is eventually demanded together with size reduction of the recording apparatus, it will become difficult to use a large motor.

In the case where the target to be printed is a thick object, such as CD-ROM, it is necessary to make the distance from the platen to the recording head large. As the wiping apparatus is normally fixed to the printer, when the recording head is moved upward to make the distance from the platen to the recording head larger, the distance between the wiping member and the recording head changes. Accordingly, the slide pressure of the wiping member to the recording head changes, making it difficult to wipe the inks adhered to the recording head satisfactorily.

For example, Japanese Laid-Open Patent Publication No. 2002-264350 discloses a technique for reducing the wiping speed of the wiping apparatus or increasing the wiping ability of the wiping member to clean the recording head adequately even if the distance from the platen to the recording head is changed.

Even with the use of the technique disclosed in Japanese Laid-Open Patent Publication No. 2002-264350, however, it is difficult to sufficiently wipe and clean the recording head with the wiper when the distance from the platen to the recording head is changed. Therefore, there was a demand for a technique which would wipe and clean the recording head more satisfactorily with the wiping member even when the distance from the platen to the recording head is changed.

SUMMARY OF THE INVENTION

It is a first object of the present invention to provide a compact liquid ejection apparatus with a simple structure. A second object is to provide a liquid ejection apparatus which is unlikely to cause liquid leakage even in usage in a state other than a horizontal state.

To achieve the above objects, the present invention provides the following liquid ejection apparatus. The liquid ejection apparatus has a cap, a cap support member, drive means, elastic means and air release means. The cap support member supports the cap. The drive means drives the cap support member to move the cap toward a liquid ejection head and cover nozzles of the liquid ejection head with the cap. The elastic means intervenes between the cap support member and the cap. The elastic means changes a distance between the cap support member and the cap as the elastic means stretches with the cap covering the nozzles. The air release means opens and closes inside the cap covering the nozzles with respect to air in accordance with a change in the distance.

The present invention also provides the following rotor. The rotor has a partially toothed gear and a rotary member. The partially toothed gear has a plurality of teeth formed on a part of the circumferential surface thereof. The rotary member rotates according to rotation of the partially toothed gear. The partially toothed gear is coupled to the rotary member in such a way as to be permitted to rotate within a predetermined range.

The present invention also provides a drive converting apparatus equipped with the above-described rotor. The drive converting apparatus has a drive gear, and a driven gear which engages with the drive gear and urging means. The drive gear engages with the partially toothed gear of the rotor. Teeth are formed around the entire circumferential surface of the driven gear. The urging means urges the driven gear toward the partially toothed gear to transmit torque from the driven gear to the partially toothed gear. The torque of the driven gear rotates the partially toothed gear in a direction of engagement with the drive gear from a state where engagement with the drive gear is broken.

The present invention further provides a cleaning apparatus equipped with the above-described drive converting apparatus. The cleaning apparatus is equipped with wiper means having a wiping member and a wiper support member. The wiping member cleanly wipes a liquid ejection head having a plurality of nozzles for ejecting a liquid. The wiper support member supports the wiping member. The positioning member of the drive converting apparatus is coupled to the wiper support member. As the rotor of the drive converting apparatus rotates, the positioning member is lifted up and down to lift the wiping member up and down.

The present invention also provides the following wiping apparatus. The wiping apparatus has a wiping member which abuts on a liquid ejection head for ejecting a liquid and wipes the liquid injection head clean. There are a plurality of positions of action at which the wiping member wipes the liquid injection head clean. Wiper position adjusting means adjusts the plurality of positions of action.

The present invention also provides another liquid ejection apparatus. The liquid ejection apparatus has a platen which supports a target, a liquid ejection head which injects a liquid to the target, a wiping member which abuts on the liquid ejection head and wipes it clean, and wiper position adjusting means which adjusts the position of action of the wiping member based on a distance from the platen to the liquid ejection head.

The present invention provides a further liquid ejection apparatus. The liquid ejection apparatus has a platen which supports a target, a liquid ejection head which injects a liquid to the target, a wiping member which abuts on the liquid injection head and wipes it clean, and wiper position adjusting means which adjusts a position of action of the wiping member based on elevation of the liquid injection head.

The present invention also provides a wiping method for wiping the liquid ejection head clean, which ejects a liquid on to a target. The wiping method includes a step of adjusting the position of action of the wiping member based on a distance from a platen which supports the target to the liquid ejection head, and a step of causing the wiping member to abut on and wipe the liquid ejection head clean.

DETAILED DESCRIPTION OF THE PREFERRED EMBODIMENTS

A first embodiment embodying the present invention will be described below with reference to FIGS. 1 to 6.

Figure 1:
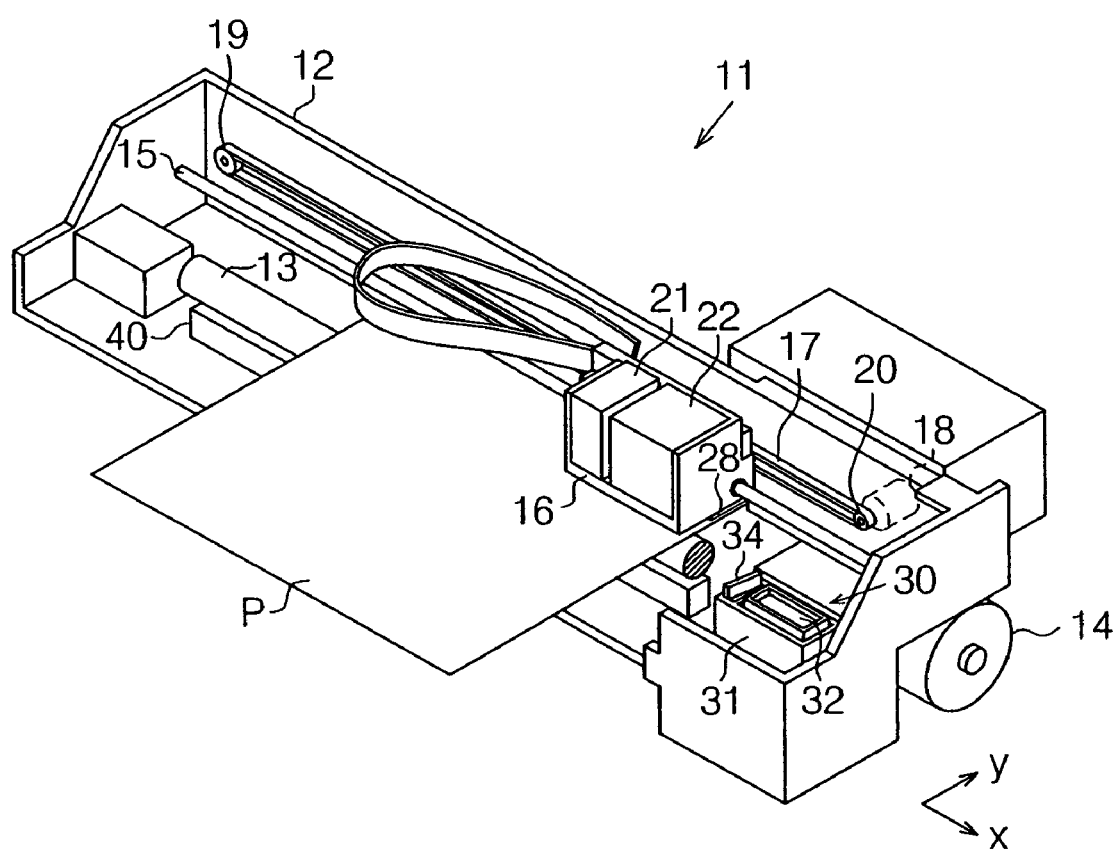
FIG. 1 is a perspective view of an ink jet type recording apparatus according to a first embodiment embodying the present invention.

As shown in FIG. 1, an ink jet type recording apparatus 11 as a liquid ejection apparatus has a frame 12, a platen 13 hung across the frame 12 and an unillustrated paper feeding mechanism equipped with a feed motor 14. The platen 13 is a support to support paper P and the paper P fed by the driving of the feed motor 14 is led to the top surface. The feed motor 14 drives unillustrated rollers to feed the paper P supported on the platen 13 in the direction of the arrow y shown in FIG. 1. A waste liquid tank 40 which retains used inks is provided under the platen 13.

A drive pulley 19 and a driven pulley 20 are fixed to the frame 12. A reversible carriage motor 18 is coupled to the drive pulley 19. A timing belt 17 is stretched around a pair of the pulleys 19 and 20. A carriage 16 is fixed to the timing belt 17. Further, a guide member 15 extending in parallel to the platen 13 is provided on the frame 12. The guide member 15 extends in parallel to the axial line extending in the lengthwise direction of the platen 13. The carriage 16 is supported on the guide member 15 in such a way as to be movable along the axial direction of the guide member 15. The carriage 16 reciprocates along the guide member 15 via the timing belt 17 by the driving of the carriage motor 18.

First and second ink cartridges 21 and 22 are detachably mounted on the carriage 16. The first ink cartridge 21 retains a black ink. The second ink cartridge 22 respectively retains magenta, cyan and yellow inks in three defined retaining chambers. A recording head 28 as a liquid ejection head is provided under the carriage 16. The recording head 28 has a plurality of unillustrated nozzles. A discharge port is provided in the bottom side of the nozzle. When an unillustrated piezoelectric element is driven based on print data, inks are supplied to the recording head 28 from both ink cartridges 21 and 22 and ink droplets are ejected toward the paper P from the discharge ports to perform printing.

A nozzle protecting device 30 for protecting the nozzles of the recording head 28 is provided at one side portion of the frame 12 which is the unprintable region (home position). The nozzle protecting device 30 also functions as a cleaning apparatus to clean the nozzles.

Figure 2:
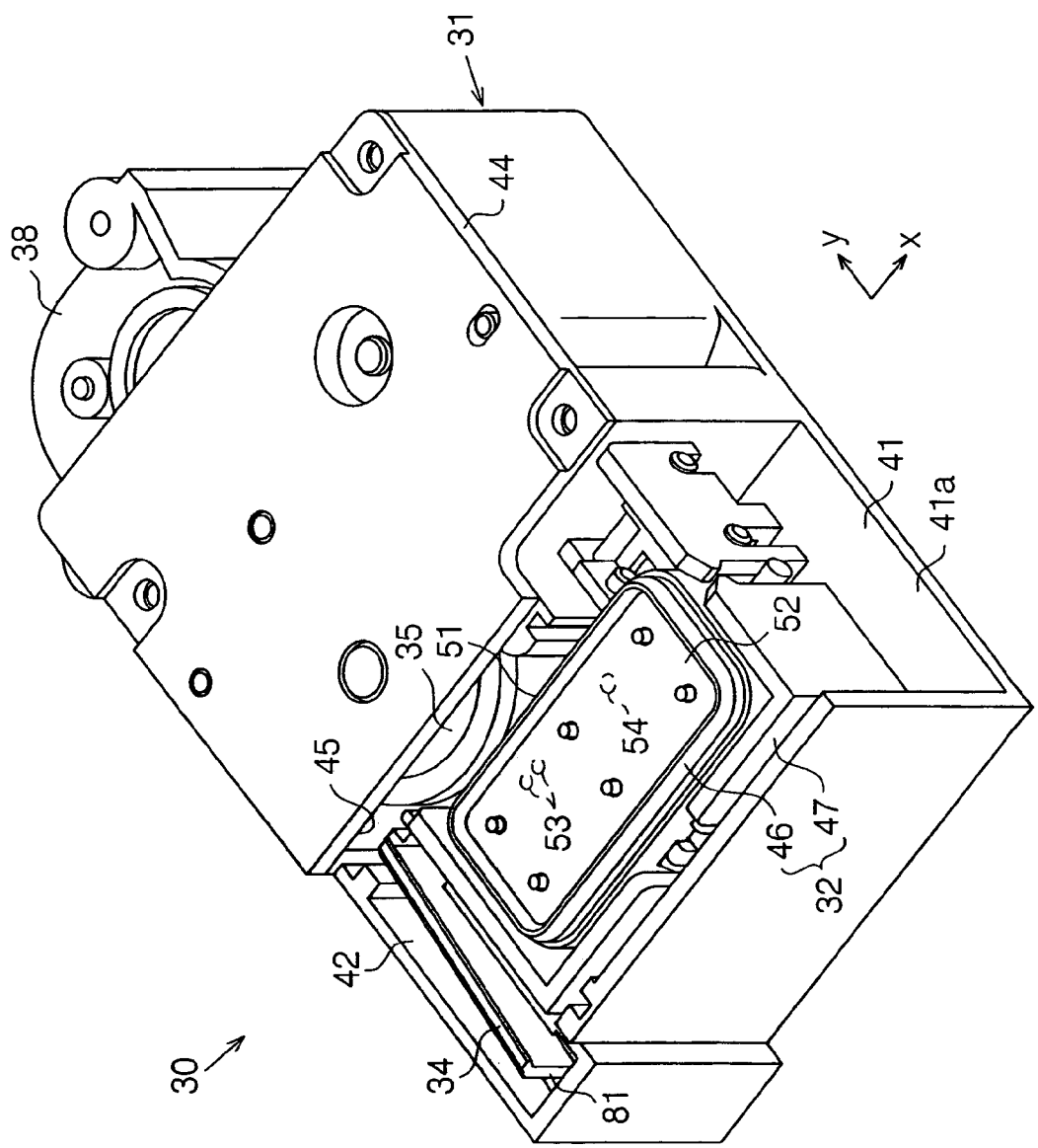
FIG. 2 is a perspective view of a nozzle protecting device equipped in the recording apparatus in FIG. 1.
Figure 3:
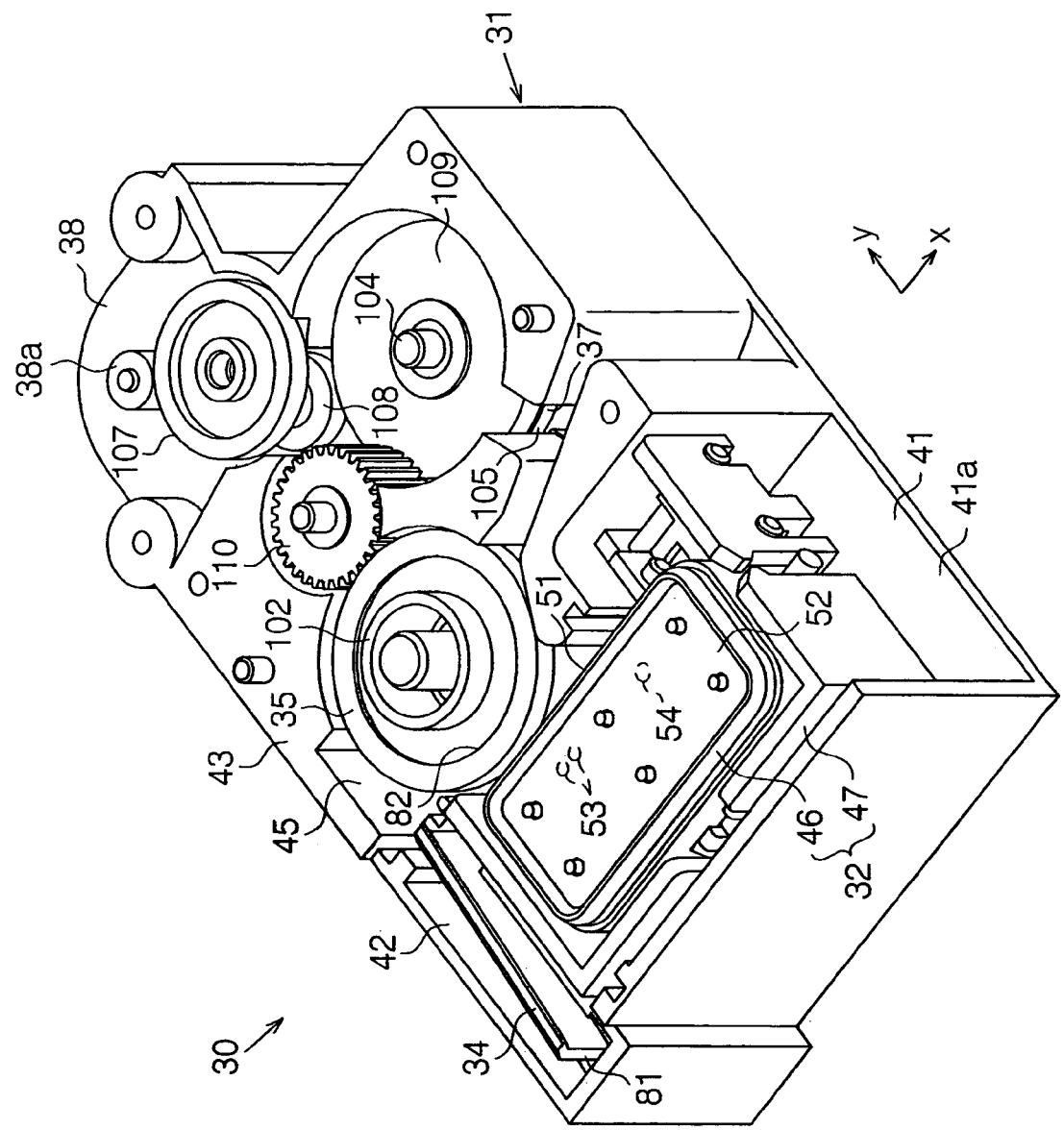
FIG. 3 is a partly exploded perspective view of the nozzle protecting device in FIG. 2.

As shown in FIGS. 2 and 3, the nozzle protecting device 30 has a case 31, a cap apparatus 32, a wiping apparatus 34, a cylindrical cam 35, a tube pump 37 and a drive motor 38.

The case 31 is a box with a shape approximately corresponding to a rectangular parallelepiped. The case 31 has a first retaining portion 41 which is open to the top and one side of the case 31 and a second retaining portion 42 which is open to the top of the case 31. Both retaining portions 41 and 42 are arranged so as to adjoin each other. As shown in FIG. 3, a third retaining portion 43 is provided in the case 31 in such a way as to adjoin the retaining portions 41 and 42. The third retaining portion 43 is closed by a lid 44. An opening 45 is provided at the boundary between the third retaining portion 43 and the first retaining portion 41 and the second retaining portion 42.

The cap apparatus 32 is retained in the first retaining portion 41. The cap apparatus 32 has a box-shaped cap 46 and a cap support member 47 to be coupled to the cap 46. The cap support member 47 has first to fourth sides 471, 472, 473 and 474. The cap support member 47 is supported at the first retaining portion 41 in such a way as to be movable along the up and down direction of the first retaining portion 41.

The cap 46 has an opening. The opening of the cap 46 has such a size as to be able to cover the nozzles of the recording head 28. A close-contact portion 51 is provided at the periphery of the opening of the cap 46. The close-contact portion 51 tightly connects the cap 46 to the recording head 28 when the cap 46 covers the nozzles of the recording head 28.

An absorption member 52, which is a sheet, is provided inside the cap 46. The absorption member 52 functions in such a way that when the cap 46 covers the nozzles of the recording head 28, the absorption member 52 retains the inks to keep the humidity inside the cap 46 high and prevent the ink from becoming dry. To prevent clogging of inks in the discharge ports at which there is not much discharge of ink droplets, the absorption member 52 receives inks dropping from the discharge ports at the time of a flashing operation of applying a drive signal irrelevant to printing to the recording head 28 whenever a given period elapses and ejects ink droplets.

Figure 4:
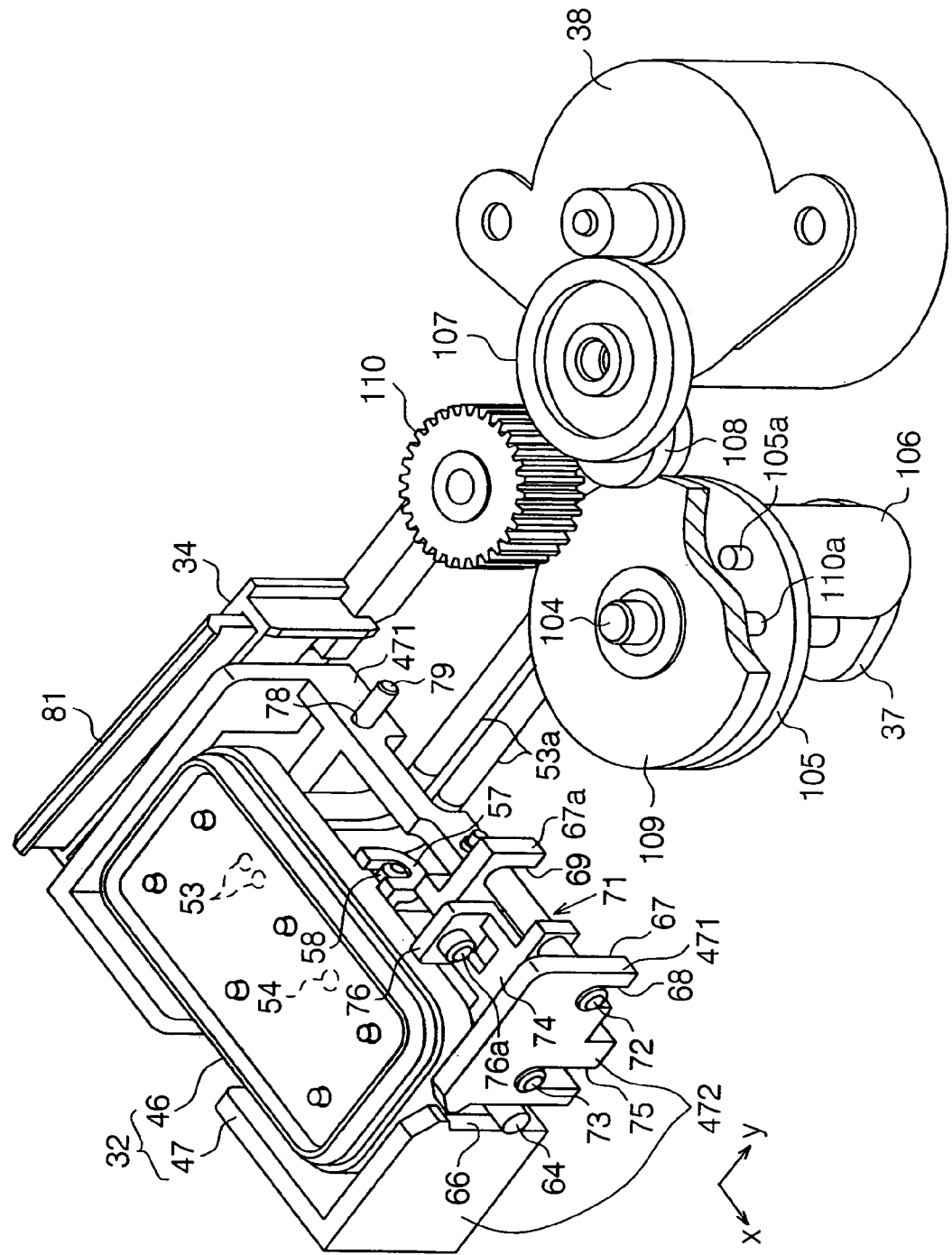
FIG. 4 is a partly exploded cross-sectional view of the nozzle protecting device in FIG. 2.

Two exhaust ports 53 penetrating the bottom of the cap 46 are formed in the cap bottom. As shown in FIG. 4, each exhaust port 53 is connected to an associated ink tube 53a. The ink remaining in the cap 46 is exhausted via each ink tube 53a. Further, highly viscous ink, dust, bubbles or the like is sucked out of the nozzles via each ink tube 53a to clean the nozzles.

A vent hole 54 as a through hole is formed in the bottom of the cap 46. The vent hole 54 functions to allow a flow of air into the cap 46. In a state where the ink remaining in the cap 46 is exhausted, i.e., at the time of air suction to evacuate the inside of the cap 46, air is led through the vent hole 54.

Figure 5:
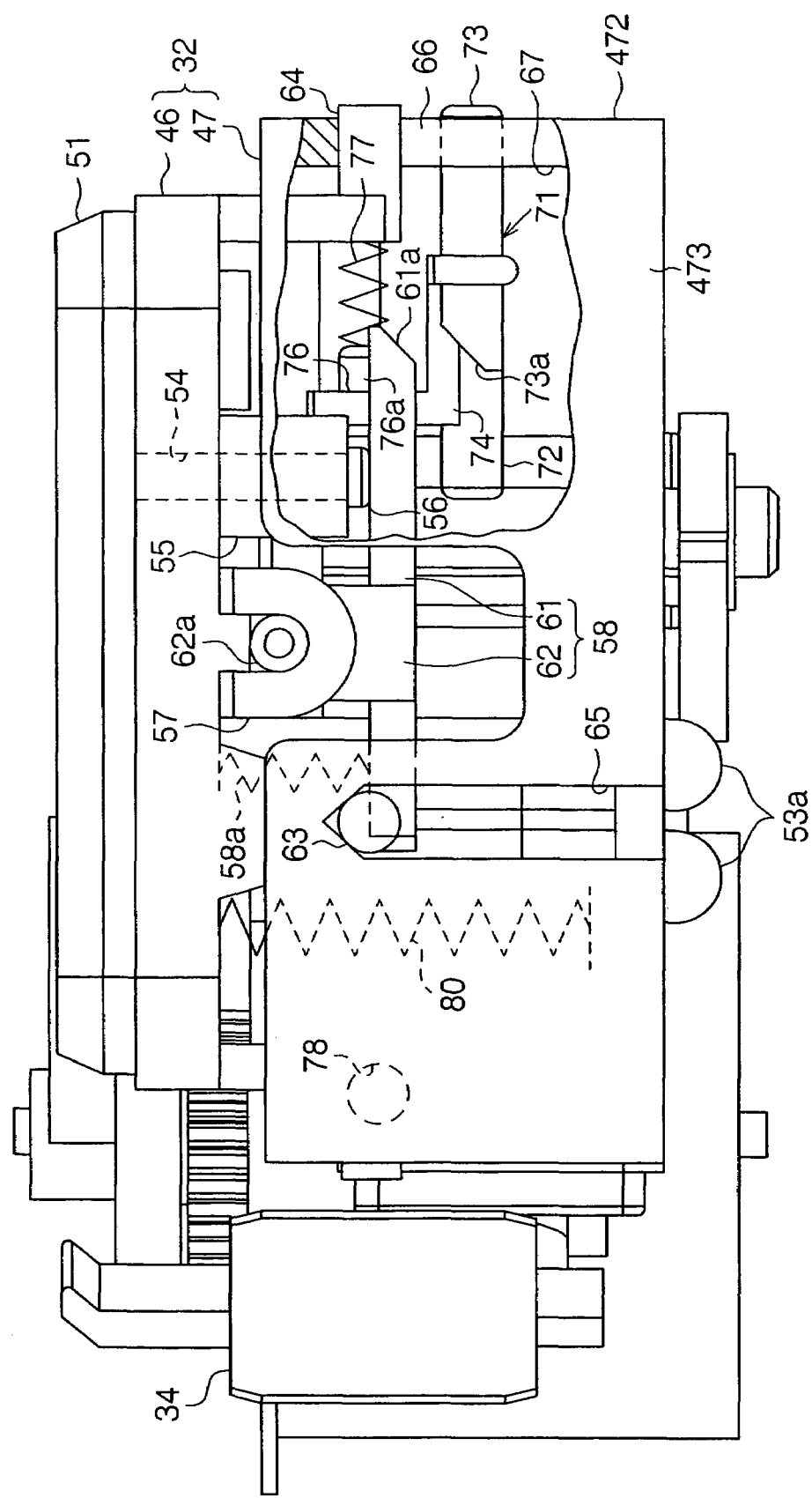
FIG. 5 is a partial cross-sectional view of the nozzle protecting device in FIG. 2.

As shown in FIG. 5, a cylinder portion 55 extends from the bottom of the cap 46. The cylinder portion 55 surrounds the vent hole 54. A valve seat 56 which surrounds the distal end of the vent hole 54 is provided at the lower end of the cylinder portion 55. The valve seat 56 is formed of a flexible material, for example, an elastomer.

As shown in FIGS. 4 and 5, two bearings 57 are arranged at the lower portion of the cap 46 in such a way as to face each other. A valve body 58 is attached to both bearings 57 in such a way as to be rotatable around a shaft 62a. The valve body 58 further includes a plate 61 extending in the lengthwise direction of the cap 46 and a support portion 62 provided near the center of the plate 61. The shaft 62a is provided at the upper end of the support portion 62.

A first portion of the plate 61 (the left-hand portion of the plate 61 in FIG. 5) is coupled to the lower side of the cap 46 via a spring member 58a as an urging means. The spring member 58a normally urges the plate 61 of the valve body 58 downward. In the case where no external force is applied to the valve body 58, the top surface of a second portion of the plate 61 (the right-hand portion of the plate 61 in FIG. 5) abuts on the valve seat 56, so that the vent hole 54 is sealed. A first inclined surface 61a inclined at a predetermined angle to the direction vertical to the cap support member 47 is formed at the end portion of the second portion of the plate 61.

A first column portion 63 is protrusively provided at the third side 473 of the cap 46 and a second column portion 64 is protrusively provided at the second side 472 of the cap 46.

The cap support member 47 is an approximately rectangular frame and the cap 46 is housed inside the cap support member 47. As shown in FIG. 5, a first long groove 65 extending along the vertical direction in FIG. 5 is formed in the third side 473 of the cap support member 47. As shown in FIGS. 4 and 5, a second long groove 66 extending along the vertical direction in the drawing is formed in the side of the cap support member 47. The column portions 63 and 64 of the cap 46 penetrate the associated long grooves 65 and 66 and are movable in the long grooves 65 and 66 along the vertical direction. The upper end of each associated long groove 65, 66 is cut away in such a way as to have a triangular cross section.

As shown in FIG. 4, a restriction plate 67a is provided at that portion of the cap support member 47 which is positioned nearly in the center in the widthwise direction thereof. The restriction plate 67a and the first side 471 of the cap support member 47 define an opening 67. The opening 67 is provided at a position facing the tube pump 37. A first short groove 68 having an approximately U-shaped cross section is formed in the second side 472 of the cap support member 47. The first short groove 68 extends from the lower portion of the second side 472 of the cap support member 47 toward the upper portion. A second short groove 69 having an approximately U-shaped cross section is formed in the restriction plate 67a. The second short groove 69 extends from the lower portion of the restriction plate 67a toward the upper portion.

As shown in FIGS. 4 and 5, a slide member 71 as a pressing member is provided at the opening 67. The slide member 71 includes a columnar support rod 72, a nearly columnar lever 73 and a link member 74. The support rod 72 and lever 73 are fixed via the link member 74. Both end portions of the support rod 72 are inserted into both short grooves 68 and 69 of the cap support member 47. With those structures, the slide member 71 is movable along the lengthwise direction of the cap support member 47 and the movement of the slide member 71 in the direction of the arrow y shown in FIG. 4 and the up and down direction of the cap support member 47 is restricted.

A second inclined surface 73a inclined relative to the vertical direction of the cap support member 47 is formed at a first end portion of the lever 73 (equivalent to the left-hand portion of the lever 73 in FIG. 5). Meanwhile, a second end portion of the lever 73 (equivalent to the right-hand portion of the lever 73 in FIG. 5) is inserted in a third long groove 75 formed in the second side 472 of the cap support member 47.

The link member 74 is not movable in the vertical direction of the cap support member 47. The link member 74 has a plate-like restriction portion 76 extending in a direction orthogonal to the axis of the support rod 72. As the slide member 71 moves toward the widthwise center of the cap support member 47, the restriction portion 76 abuts on the restriction plate 67a of the cap support member 47. As a result, the movement of the slide member 71 along the widthwise direction of the cap support member 47 is restricted.

As shown in FIG. 4, the restriction portion 76 is provided with a projection 76a protruding in the direction of the arrow x in FIG. 4. As shown in FIG. 5, a spring member 77 as an urging means is provided between the projection 76a and the inner surface of the second side 472 of the cap support member 47. The spring member 77 urges the slide member 71 leftward or toward the widthwise center of the cap support member 47. In the case where external force is not applied to the slide member 71, the restriction portion 76 of the slide member 71 and the restriction plate 67a of the cap support member 47 abut on each other.

As shown in FIG. 4, a through hole 78 is formed in that portion of the first side 471 of the cap support member 47 which faces the drive motor 38. A columnar positioning member 79 is inserted in the through hole 78. The positioning member 79 is movable along the direction of the arrow y shown in FIG. 4. The positioning member 79 is connected to the cap support member 47 via an unillustrated spring member. The spring member urges the positioning member 79 in the direction of the arrow y shown in FIG. 4.

The cap 46 is coupled to the cap support member 47 via a spring member 80 as an elastic means as shown in FIG. 5 in such a way that both column portions 63 and 64 of the cap 46 penetrate to the respective long grooves 65 and 66 of the cap support member 47. The spring member 80 urges the cap 46 in such a way that the cap 46 and the cap support member 47 are separated from each other along the vertical direction of the cap support member 47. The movements of the cap 46 in the direction of the arrow x and the direction of the arrow y shown in FIG. 4 with respect to the cap support member 47 are restricted.

With no external force applied to the cap 46, therefore, the distance between the cap 46 and the cap support member 47 in the vertical direction reaches a maximum. As shown in FIG. 5, the individual column portions 63 and 64 of the cap 46 abut on the upper end portions of the respective long grooves 65 and 66 of the cap support member 47, thus restricting an increase in the distance between the cap 46 and the cap support member 47.

With the cap 46 and the cap support member 47 coupled together, the inclined surface 61a of the valve body 58 (plate 61) of the cap 46 and the inclined surface 73a of the lever 73 are placed at positions facing each other with a predetermined distance therebetween. As will be discussed later, when the distance between the cap 46 and the cap support member 47 is at a minimum, the lever 73 is positioned above the plate 61. When the distance between the cap 46 and the cap support member 47 is at the maximum, the lever 73 is positioned below the plate 61 and outside the movable range of the plate 61.

As shown in FIGS. 1 to 3, the wiping apparatus 34 is housed in the second retaining portion 42 of the case 31 in such a way as to be movable in the vertical direction of the case 31. The wiping apparatus 34 has a wiping member 81 which has an approximately rectangular parallelepiped shape and is formed of an elastic material. Therefore, when the carriage 16 is driven with the wiping apparatus 34 moved to the upper portion and the recording head 28 crosses above the wiping apparatus 34, the wiping member 81 slides in contact with the recording head 28 to wipe the nozzles of the recording head 28 clean.

Figure 6:
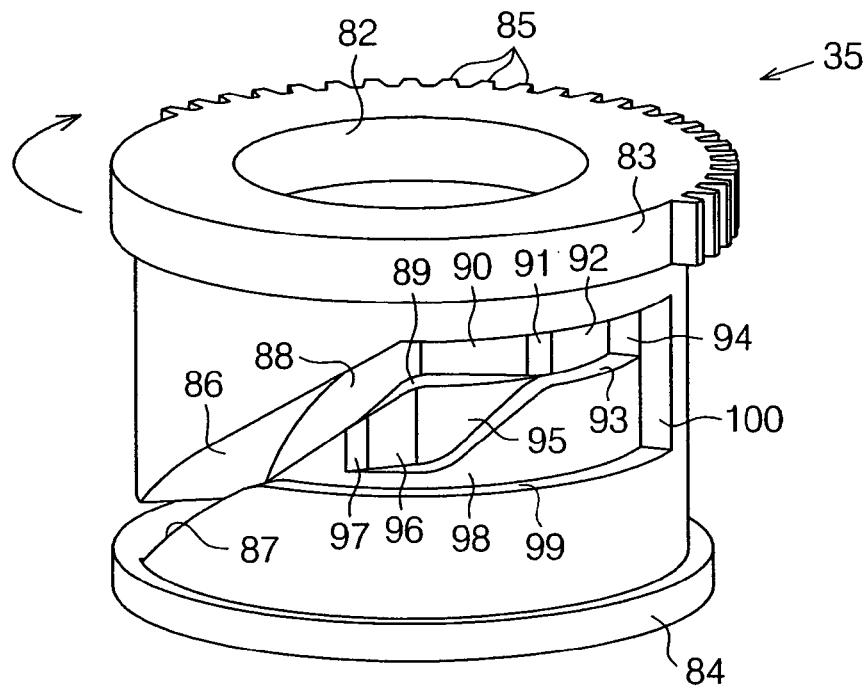
FIG. 6 is a perspective view of a cylindrical cam provided in the nozzle protecting device in FIG. 2.

As shown in FIG. 6, the cylindrical cam 35 has an insertion hole 82 inside. An upper end portion 83 and a lower end portion 84 of the cylindrical cam 35 are both annular and extend in the diametrical direction of the cylindrical cam 35. A plurality of teeth 85 having the same shape are formed at an equal pitch on only one circumferential half of the periphery of the upper end portion 83 of the cylindrical cam 35. The remaining circumferential half of the upper end portion 83 of the cylindrical cam 35 has a smooth arcuate shape. A cam groove 86 is provided between the upper end portion 83 and the lower end portion 84 of the cylindrical cam 35. The cam groove 86 is provided below that portion of the upper end portion 83 which has a smooth shape and is defined by fourteen, first to fourteenth surfaces 87 to 100.

The cylindrical cam 35 is positioned in the opening 45 of the third retaining portion 43 as shown in FIG. 3. A shaft portion 102 fixed to the third retaining portion 43 is inserted into the insertion hole 82 of the cylindrical cam 35. The cylindrical cam 35 rotates about the shaft portion 102. With the cylindrical cam 35 inserted in the shaft portion 102, the positioning member 79 (see FIG. 4) of the cap support member 47 is engaged with the cam groove 86 of the cylindrical cam 35.

As the cylindrical cam 35 is rotated in the direction of the arrow, as shown in FIG. 6, first, the positioning member 79 placed at the lowest position of the cam groove 86 (the position for contact with the lower end portion 84) is guided to the highest position by the first to third surfaces 87, 88 and 89 extending askew to the axial direction of the cylindrical cam 35. As the cylindrical cam 35 is further rotated in the arrow direction, the positioning member 79 abuts on the sixth to eighth surfaces 92, 93 and 94 via the fourth and fifth surfaces 90 and 91 extending in parallel to the axial direction. The distances from the rotational center of the cylindrical cam 35 to the three surfaces 90, 91 and 92 become gradually longer. The positioning member 79 is pressed in the direction opposite to the direction of the arrow y (see FIG. 4).

As the cylindrical cam 35 is rotated in the direction opposite to the arrow in FIG. 6 thereafter, the positioning member 79 is guided to the sixth surface 92 and then abuts on the ninth surface 95 farther from the rotational center of the cylindrical cam 35 than the fourth surface 90. Then, it is guided to the seventh surface 93 extending askew to the rotational direction and the cap support member 47 as a whole slides downward due to the dead weight. Thereafter, it abuts on the twelfth and thirteenth surfaces 98 and 99 through the tapered tenth and eleventh surfaces 96 and 97. The distances of the three surfaces 95, 96 and 97 from the rotational center gradually become longer and the positioning member 79 is pressed further in the direction opposite to the direction of the arrow y (see FIG. 4).

When the cylindrical cam 35 is rotated again in the direction of the arrow in FIG. 6, the positioning member 79 is guided to the twelfth and thirteenth surfaces 98 and 99, positioned in parallel to the rotational direction, and abuts on the fourteenth surface 100. When the cylindrical cam 35 is rotated in the direction opposite to the direction of the arrow thereafter, the positioning member 79 is guided to the twelfth and thirteenth surfaces 98 and 99 and then guided to the first and second surfaces 87 and 88, and the cap support member 47 slides downward and is returned to the initial, lowest position due to the dead weight. The second surface 88 has a shorter distance from the rotational center than the twelfth surface 98 and the positioning member 79 is returned in the direction of the arrow y (see FIG. 4) by the action of the spring member. The positioning member 79 is guided in the up and down direction by the rotation of the cylindrical cam 35 as described above. Accordingly, the cap support member 47 as a whole is moved in the up and down direction.

As shown in FIG. 3, the tube pump 37 is retained in the third retaining portion 43 of the case 31 in such a way as to not contact the cylindrical cam 35. As shown in FIG. 4, the tube pump 37 has a pump wheel 105, rotatably supported on a rotary shaft 104, and a roller 106 which moves along an unillustrated support groove of the pump wheel 105. The ink tubes 53a are positioned, partly overlapped, in the space between the third retaining portion 43 (see FIG. 3) and the pump wheel 105. In FIG. 4, the ink tube 53a is illustrated only partially for the sake of convenience.

As the pump wheel 105 is rotated in the forward direction, the roller 106 rotates while sequentially pressing the ink tubes 53a. This depressurizes the inside of the ink tubes 53a on the upstream side of the tube pump 37.

As the pump wheel 105 is rotated in the reverse direction, a release state where the roller 106 slightly contacts the ink tubes 53a is maintained. As a result, the pressure in the tube pump 37 becomes uniform over the entire tube pump 37. Further, a shortcoming caused by adhesion or the like of the roller 106 and the ink tubes 53a is prevented.

As shown in FIG. 3, the drive motor 38 is housed in the third retaining portion 43 in such a way as to be rotatable forward and reversely. The forward/reverse rotation causes the drive force of the drive motor 38 to be transmitted to the wiping apparatus 34, the cylindrical cam 35 and the tube pump 37 via first to fourth gears 107 to 110.

A drive gear 38a is fixed to the distal end of the rotary shaft of the drive motor 38. The drive gear 38a is coupled to the third gear 109 via the first gear 107 and the second gear 108 which are rotatably supported on the case 31. The third gear 109 is fixed to the distal end of the rotary shaft 104 of the tube pump 37 retained in a retaining portion Kc of the case 31. The third gear 109 is further coupled to the fourth gear 110 rotatably supported on the case 31. Plural teeth of the fourth gear 110 are engaged with the teeth 85 of the cylindrical cam 35 shown in FIG. 6.

As the drive motor 38 is rotated forward, the drive force of the drive motor 38 is transmitted to the cylindrical cam 35 via the first to fourth gears 107, 108, 109 and 110 and the cylindrical cam rotates in the direction of the arrow as shown in FIG. 6. Because the plural teeth 85 are provided only on one circumferential half of the cylindrical cam 35, they only rotate the cam by one-half of its circumference at maximum. When the forward rotation of the drive motor 38 is changed to the reverse rotation, the cylindrical cam 35 is rotated in the direction opposite to the direction of the arrow. The cylindrical cam 35 only rotates by one-half of its circumference at maximum this time again.

As shown in FIG. 4, the third gear 109 is so arranged as to overlap the upper side of the pump wheel 105 of the tube pump 37 and is rotatably supported on the rotary shaft 104. A first projection 110a projects from the lower surface of the third gear 109. Meanwhile, a second projection 105a is provided at the top surface of the pump wheel 105 and the first projection 110a and the second projection 105a are equal in distance from the rotary shaft 104. The first projection 110a and the second projection 105a are provided in such a way as to partly overlap each other in the rotational direction of the rotary shaft 104. In accordance with the relative positions of the fourth gear 110 and the pump wheel 105 in the rotational direction, the first projection 110a and the second projection 105a selectively abut on each other or move apart from each other.

When the forward rotation of the drive motor 38 rotates the third gear 109 in the forward direction so that the first projection 110a and the second projection 105a abut on each other, therefore, the torque of the third gear 109 is transmitted via the projections 105a and 110a to the pump wheel 105 so that the pump wheel 105 rotates forward.

When the forward rotation of the drive motor 38 is changed to the reverse rotation, the third gear 109 changes its forward rotation to the reverse direction, causing the first projection 110a and the second projection 105a to part from each other. Then, the rotation of the pump wheel 105 stops. When the third gear 109 makes nearly one turn thereafter, the first projection 110a and the second projection 105a abut on each other again to transmit the torque of the third gear 109 via the projections 105a and 110a to the pump wheel 105, so that the pump wheel 105 rotates reversely.

That is, there is a time lag of nearly one turn of the third gear 109 set between the switching of the forward rotation of the drive motor 38 to the reverse rotation and the start of the reverse rotation of the pump wheel 105. Likewise, there is a similar time lag set between the switching of the reverse rotation of the drive motor 38 to the forward rotation and the start of the forward rotation of the pump wheel 105.

In the case where the drive motor 38 rotates reversely and then starts rotating forward, therefore, first, the cylindrical cam 35 makes half a rotation at maximum in the direction of the arrow in FIG. 6. As the drive motor 38 further rotates forward, the pump wheel 105 starts rotating forward with a delay. In the case where the drive motor 38 rotates forward and then starts rotating reversely, the cylindrical cam 35 makes half a turn at maximum in the direction opposite to the direction of the arrow in FIG. 6. As the drive motor 38 further rotates reversely, the pump wheel 105 starts rotating reversely with a delay.

The action of the nozzle protecting device 30 with the above-described structure will be described based on FIGS. 7 to 11. In FIGS. 7 to 11, the illustration of the cap support member 47 is limited only to the slide member 71 and the positioning member 79 for the sake of convenience. Further, the illustration of the individual spring members 58a, 77 and 80 is omitted for the sake of convenience.

Figure 7:
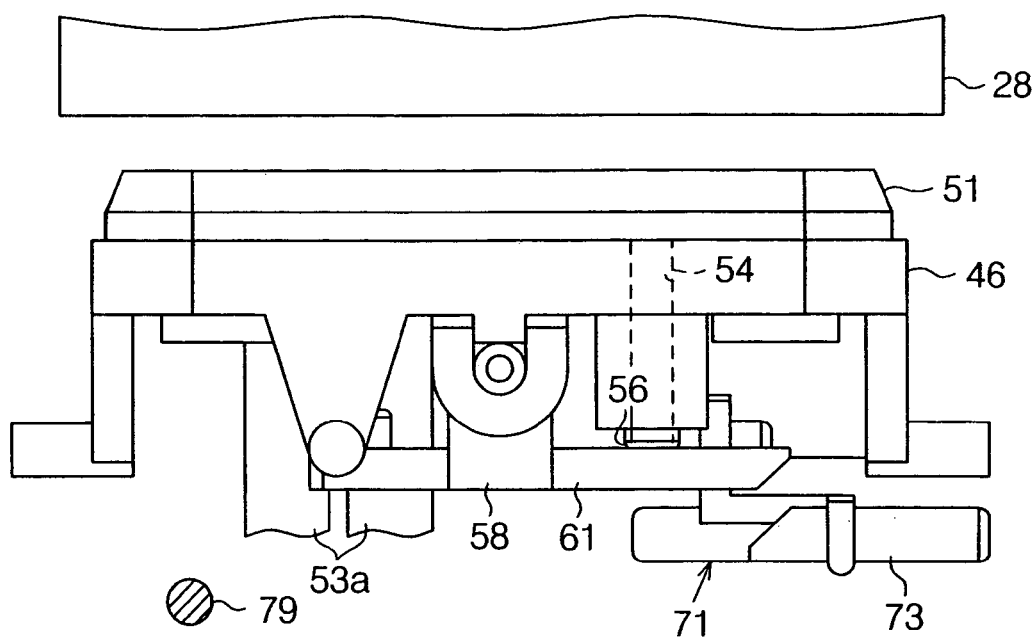
FIG. 7 is a diagram showing a state before a close-contact portion of the nozzle protecting device in FIG. 2 abuts on a recording head.

First, a process of executing a cleaning operation and flashing operation is executed in the recording apparatus 11, in which the carriage 16 is moved to the home position of the frame 12. Then, as shown in FIG. 7, the recording head 28 of the carriage 16 faces the cap 46 of the nozzle protecting device 30. In this state, the positioning member 79 is engaged with the cam groove 86 of the cylindrical cam 35 shown in FIG. 6 at the lowest position; specifically, it abuts on the first surface 87 and the second surface 88 of the cam groove 86.

FIG. 7 shows a state where the distance between the cap 46 and the positioning member 79 (cap support member 47) is maximum. The lever 73 included in the slide member 71 is arranged below the valve body 58 of the cap 46. The plate 61 of the valve body 58 abuts on the valve seat 56 so that the vent hole 54 is closed. In this state, even when the flashing operation is performed and the inks inside the cap 46 are discharged, the inks are prevented from leaking from the vent hole 54.

After the cleaning operation is carried out, the drive motor 38 is rotated forward and the drive force of the drive motor 38 is transmitted to the teeth 85 of the upper end portion 83 of the cylindrical cam 35 via all of the gears 107, 108, 109 and 110 (see FIG. 3), causing the cylindrical cam 35 to rotate in the direction of the arrow in FIG. 6. Then, the positioning member 79 moves and rises while abutting on the second and third surfaces 88 and 89 of the cam groove 86 of the cylindrical cam 35.

Figure 8:
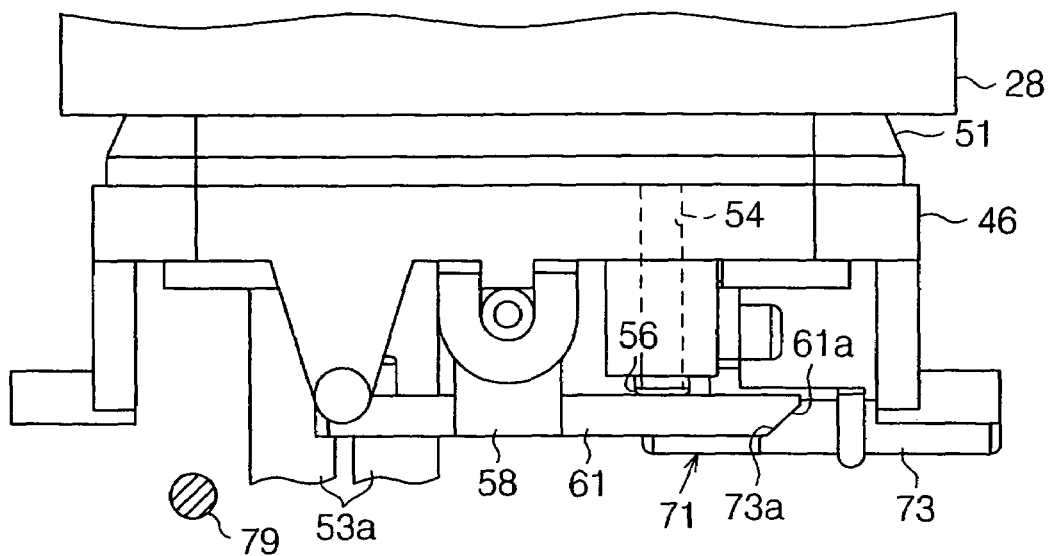
FIG. 8 is a diagram showing a state where the close-contact portion in FIG. 7 abuts on the recording head.

Then, the cap support member 47 rises in accordance with the rising of the positioning member 79, the close-contact portion 51 of the cap 46 abuts on the recording head 28 and covers the recording head 28 as shown in FIG. 8. The upward movement of the cap 46 is restricted by the recording head 28. Further, the spring member 80 provided between the cap 46 and the cap support member 47 elastically deforms, thus reducing the relative distance between the cap 46 and the cap support member 47.

Figure 9:
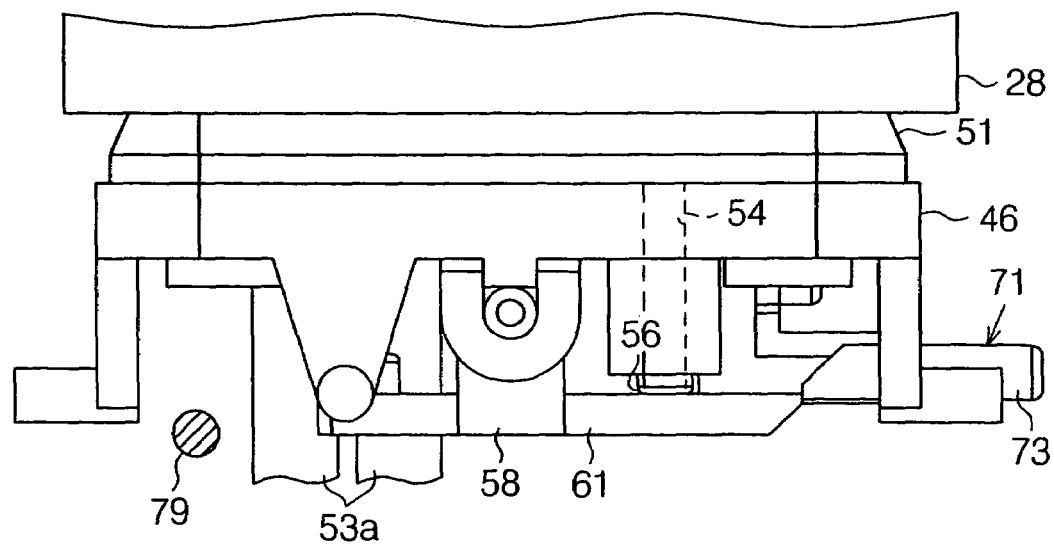
FIG. 9 is a diagram showing a state where a lever of the nozzle protecting device in FIG. 2 protrudes outward.

Consequently, as a predetermined time elapses, the inclined surface 61a of the plate 61 abuts on the inclined surface 73a of the lever 73. Further, as the drive motor 38 is rotated forward to move the cap support member 47 upward, the resistance between the inclined surface 73a of the plate 61 and the inclined surface 61a of the lever 73 prevails against the elastic force of the spring member 77, so that the spring member 77 elastically deforms, causing the lever 73 to move rightward as shown in FIG. 9.

Figure 10:
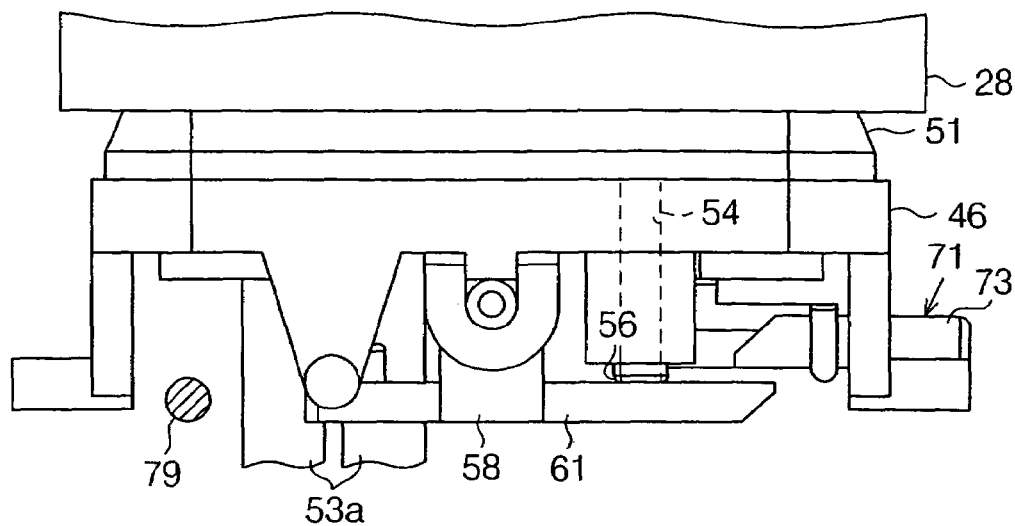
FIG. 10 is a diagram showing a state where a cap of the nozzle protecting device in FIG. 2 approaches its closest position to a cap support member.

As the positioning member 79 moves to the position in the cam groove 86 of the cylindrical cam 35 shown in FIG. 6 where the third surface 89 and the fourth surface 90 abut on each other, the distance between the cap 46 and the cap support member 47 reaches the minimum and the lever 73 is positioned above the plate 61 of the lever 73, as shown in FIG. 10. At this time, the lever 73 is moved leftward due to elastic restoration of the spring member 77 of the slide member 71.

As the drive motor 38 is rotated further forward, the positioning member 79 slides in abutment on the fifth to seventh surfaces 91, 92 and 93 of the cam groove 86 of the cylindrical cam 35 shown in FIG. 6 and abuts on the eighth surface 94. Then, the teeth 85 of the upper end portion 83 of the cylindrical cam 35 moves to the position where it does not contact the third gear 109 (see FIG. 3) and the rotation of the cylindrical cam 35 is stopped.

When the rotation of the cylindrical cam 35 is stopped and the drive motor 38 continues rotating further forward, the pump wheel 105 of the tube pump 37 starts the forward rotation. As shown in FIG. 10, therefore, the nozzles of the recording head 28 are covered with the cap 46 and with the valve seat 56 abutting on the plate 61, the suction by the tube pump 37 is carried out. Then, the inside of the cap 46 is depressurized.

Then, inks as fluids in the ink cartridges 21 and 22 (see FIG. 1), flow inside the cap 46 via the nozzles of the recording head 28. Inks with increased viscosity in the vicinity of the nozzles, dust adhered to the nozzles, bubbles generated by replacement of the cartridges, or the like are exhausted to the outside via the ink tubes 53a and the cleaning operation is executed.

Thereafter, when the driving of the drive motor 38 is stopped and suction by the tube pump 37 is stopped, the inks are held inside the cap 46.

In the case where printing starts again from the state shown in FIG. 10, the drive motor 38 is rotated reversely. Then, the drive force of the drive motor 38 is transmitted to the teeth 85 of the cylindrical cam 35 shown in FIG. 6 via the first to third gears 107 to 109 (see FIG. 3) and the cylindrical cam 35 is rotated in the direction opposite to the direction of the arrow in FIG. 6.

Figure 11:
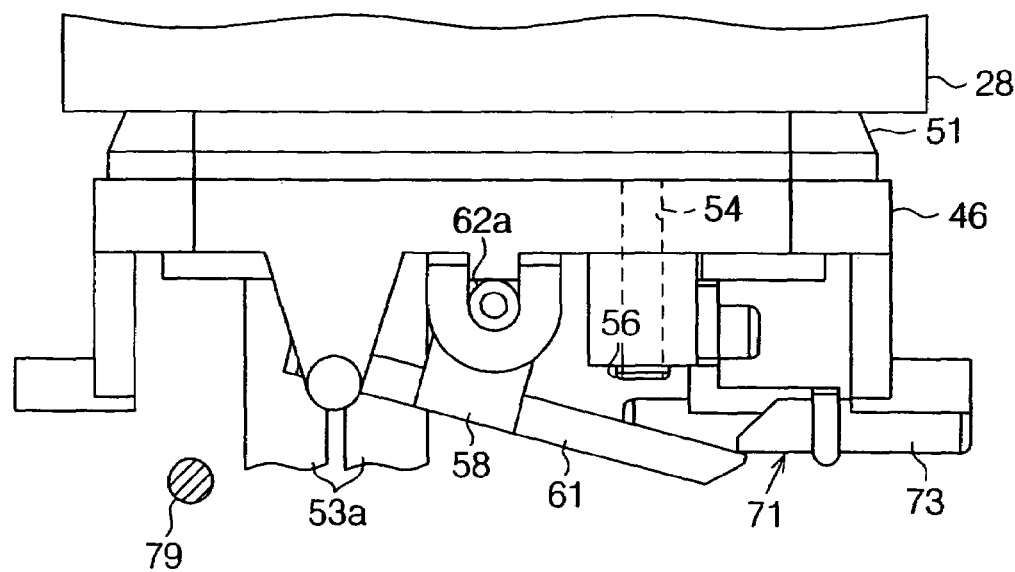
FIG. 11 is a diagram showing a state where a valve body equipped in the nozzle protecting device in FIG. 2 rotates.

Then, the positioning member 79 moves in abutment on the seventh surface 93, the ninth surface 95, the tenth surface 96 and the eleventh surface 97 of the cylindrical cam 35 and moves downward to the position where it abuts on the twelfth and thirteenth surfaces 98 and 99. Therefore, the cap support member 47 moves downward and the spring member 80 provided between the cap support member 47 and the cap 46 is elastically restored. As a result, as shown in FIG. 11, with the cap 46 abutting on the recording head 28, the lever 73 of the cap support member 47 moves downward so that downward pressure is applied to the plate 61 of the cap 46 from the lever 73. Consequently, the plate 61 is rotated clockwise in FIG. 11 about the shaft 62a as the rotational center and the valve seat 56 is separated from the plate 61.

Because the drive force of the drive motor 38 is not transmitted to the tube pump 37 at this time, the tube pump 37 is stopped with the roller 106 pressing against the ink tubes 53a. Even if the valve seat 56 and the plate 61 are separated from each other to set the vent hole 54 open, therefore, the ink tubes 53a are pressed so that inks do not leak through the vent hole 54.

The drive motor 38 is rotated forward again, the drive force of the drive motor 38 is transmitted to the teeth 85 of the cylindrical cam 35 via the first to third gears 107 to 109 and the cylindrical cam 35 is rotated in the direction of the arrow in FIG. 6. Then, the positioning member 79 slides in abutment on the twelfth and thirteenth surfaces 98 and 99 of the cylindrical cam 35 and abuts on the fourteenth surface 100. Then, the teeth 85 of the cylindrical cam 35 moves to the position where it does not contact the third gear 109 (see FIG. 3) and the rotation of the cylindrical cam 35 is stopped.

When the rotation of the cylindrical cam 35 is stopped, the rotation of the tube pump 37 is started. As shown in FIG. 11, therefore, the nozzles of the recording head 28 are covered with the cap 46 and with the valve seat 56 set apart from the plate 61, the suction by the tube pump 37 is carried out. As a result, the inside the cap 46 is depressurized.

Then, air flows inside the cap 46 via the vent hole 54. Then, the inks held inside the cap 46 are exhausted to the outside via the ink tubes 53a and so-called air suction is carried out. Consequently, the of the inside the cap 46 is filled with air.

When the driving of the drive motor 38 is stopped, suction by the tube pump 37 is stopped and then the drive motor 38 is rotated reversely, the drive force of the drive motor 38 is transmitted to the teeth 85 of the cylindrical cam 35 shown in FIG. 6 via the first to third gears 107 to 109, and the cylindrical cam 35 is rotated in the direction opposite to the arrow direction.

The positioning member 79 slides in abutment on the twelfth and thirteenth surfaces 98 and 99 and moves downward in abutment on the first and second surfaces 87 and 88. Then, the cap support member 47 moves downward and the lever 73 moves downward outside the movable range of the plate 61. As a result, the plate 61 rotates counterclockwise in FIG. 11 about the shaft 62a due to elastic restoration of the spring member 58a and abuts on the valve seat 56.

When the positioning member 79 moves down to the position where it contacts the lower end portion 84 of the cylindrical cam 35 shown in FIG. 6, the distance between the cap 46 and the cap support member 47 reaches maximum and the cap 46 parts from the recording head 28 as shown in FIG. 7.

At this time, the inks are not held inside the cap 46 because of air suction being performed, so that even if the recording apparatus 11 is placed in a state other than a horizontal state, the inks do not fall from the cap 46.

The present embodiment has the following advantages.

With the driving of the drive motor 38, the nozzles are covered with the cap 46, making it possible to prevent the inks in the nozzles from becoming dried. Further, it is possible to change the distance between the cap 46 and the cap support member 47 by driving the drive motor 38 and selectively opening and closing the inside the cap 46 with respect to air. It is therefore possible to control both prevention of the inks in the nozzles from becoming dried and opening and closing of the inside of the cap 46 with respect to air by using the single drive motor 38. As a result, the apparatus can be simplified.

With the cap 46 covering the nozzles, air suction can be performed by separating the plate 61 from the valve seat 56, opening the inside of the cap 46 to air and driving the tube pump 37. With this structure, even if the recording apparatus 11 is placed in a state other than a horizontal state, it is possible to make it difficult for the inks inside the cap 46 to leak to the outside.

The valve seat 56 is formed of a flexible material. Therefore, the plate 61 tightly contacts the valve seat 56 well, so that with the plate 61 abutting on the valve seat 56, it is possible to prevent the inks from leaking or air from flowing in from the abutting portion. This can maintain the performance of the apparatus adequately.

When the distance between the cap support member 47 and the cap 46 is minimum (see FIG. 10), the lever 73 is placed above the valve body 58 (plate 61). When the distance between the cap support member 47 and the cap 46 increases, the lever 73 contacts the plate 61 from above and presses the plate 61 downward. If the drive motor 38 is driven in the direction of reverse rotation with the cap 46 covering the nozzles, therefore, the distance between the cap support member 47 and the cap 46 increases, so that the plate 61 is pressed downward from above and parts from the valve seat 56, setting inside the cap 46 open to air. It is possible to execute air suction by driving the tube pump 37 by driving the drive motor 38 in the forward rotation.

When the drive motor 38 is further driven in the direction of reverse rotation, the distance between the cap support member 47 and the cap 46 reaches maximum, making it possible to separate the cap 46 from the recording head 28. That is, the inside of the cap 46 can be opened to air at the suitable timing for air suction, which is immediately before separation of the cap 46 from the recording head 28.

The spring member 58a urges the plate 61 in a direction to abut on the valve seat 56. When downward force is applied to the plate 61 from above, therefore, the plate 61 is set apart from the valve seat 56, opening the inside of the cap 46 to air, but the vent hole 54 is closed by the urging force of the spring member 58a otherwise. That is, only when air suction is performed, downward force is applied to the plate 61 from above to set the inside of the cap 46 open to air, and the plate 61 can be made to abut on the valve seat 56 otherwise. At times than other during the air suction, therefore, the vent hole 54 can be closed by abutting the plate 61 on the valve seat 56, thereby making it possible to prevent the inks from leaking to the outside as a result of the vent hole 54 being opened.

The plate 61 is rotatable with respect to the cap 46 and the lever 73 is placed outside the movable range of the plate 61 when the distance between the cap support member 47 and the cap 46 is maximum. Even if the plate 61 is separated from the valve seat 56 pressed downward by the lever 73, when the distance between the cap 46 and the cap support member 47 reaches maximum, the lever 73 is placed outside the movable range of the plate 61, so that the plate 61 is not pressed by the lever 73. As a result, the plate 61 moves upward due to the urging force of the spring member 58a and abuts on the valve seat 56. When the distance between the cap 46 and the cap support member 47 reaches maximum, i.e., when the cap 46 is separated from the nozzles of the recording head 28, therefore, the vent hole 54 is closed. For example, leakage of the inks from the vent hole 54 can be prevented at the time of performing the flashing (reserve ejection) operation to prevent clogging or the like of the openings of the nozzles by discharging the inks by application of a drive signal irrelevant to printing by the recording head 28.

The inclined surfaces 61a and 73a inclined in the movement direction of the cap support member 47 are respectively formed on the lower surface of the plate 61 and the top surface of the lever 73. When the lever 73 pushes the plate 61 in such a direction that the plate 61 abuts on the valve seat 56, therefore, the pressing force of the lever 73 is converted to a force to slide the lever 73 itself. It is therefore unnecessary to separately provide a drive mechanism to slide the lever 73, making it possible to simplify the structure of the apparatus.

The lever 73 is provided with the urging member to urge the lever 73 itself in the slide direction. Even if the lever 73 is slid to avoid the plate 61 when the lever 73 is moved upward, it is returned to the original position by the urging member. This can simplify the drive mechanism for sliding the lever 73 and can simplify the structure of the apparatus.

The drive force of the drive motor 38 is transmitted to the cap support member 47 via the cylindrical cam 35 to move the cap support member 47 up and down. Based on the shape of the cylindrical cam 35, therefore, the up/down position of the cap support member 47 can be finely changed. And, it is possible to easily execute control to selectively open and close the inside of the cap 46 with respect to air while covering the nozzles with the cap 46 or to separate the cap 46 from the nozzles.

The drive force from the drive motor 38 is transmitted to the cylindrical cam 35, which moves the cap support member 47 up and down, and the tube pump 37 with a predetermined phase difference. Therefore, the up and down movement of the cap support member 47 and the driving of the tube pump 37 can be accomplished by a single drive motor 38. This results in elimination of the need to provide a plurality of drive motors 38 in order to prevent the inks in the nozzles from becoming dried and executing air suction, thus making it possible to simplify the structure of the apparatus.

A second embodiment embodying the present invention will be described below with reference to FIGS. 12 to 15. As compared with the embodiment in FIGS. 1 to 11, members including the valve body 58, the support rod 72 and the lever 73 are omitted and an air release means different from that of the embodiment in FIGS. 1 to 11 is provided in this embodiment. In this embodiment, those items which differ from the embodiment in FIGS. 1 to 11 are described and the same symbols are given to similar portions and their descriptions are omitted. FIGS. 12 to 15 are side views of the cap apparatus 32 according to this embodiment as seen from the third retaining portion 43 (see FIG. 3).

Figure 12:
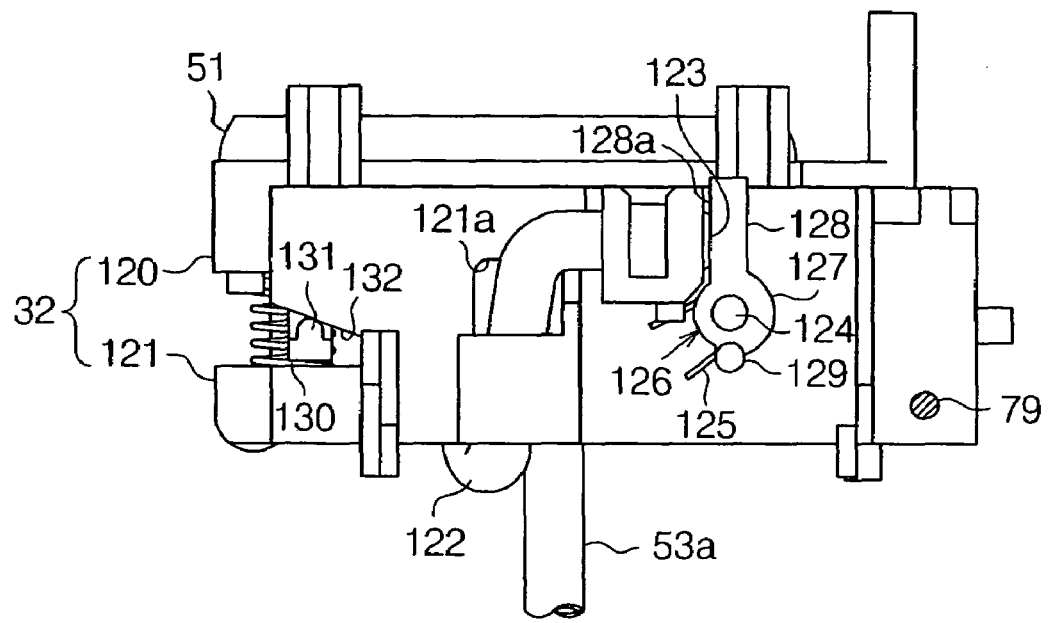
FIG. 12 is a side view of a nozzle protecting device according to a second embodiment of the present invention.

The cap apparatus 32 has a cap 120 and a cap support member 121 coupled to the cap 120, as shown in FIG. 12. The cap support member 121 is supported at the first retaining portion 41 in FIG. 3 in such a way as to be slidable in the up and down direction.

The cap 120, like the cap 46 in FIG. 2, is a box with the top side open, and is retained inside the cap support member 121 which is formed in an approximately rectangular frame. The opening of the cap 120 has such a size as to be able to cover the nozzles of the recording head 28. The close-contact portion 51 is provided at the periphery of the opening of the cap 120.

The exhaust ports 53 provided in the bottom of the cap 120 are connected to the ink tubes 53a and the inks remaining in the cap 120 are exhausted via the ink tubes 53a.

The vent hole 54 as a through hole is formed in the bottom of the cap 120 (see FIG. 5). The proximal end of an air tube 122 is connected to the vent hole 54 and the distal end of the air tube 122 is led around from below the cap 120 and is supported from the inside of the cap support member 121 to the outer side surface (the third retaining portion 43 side) via a hole portion 121a. Further, a valve seat 123 is provided integral with the distal end of the air tube 122. The air tube 122 and the valve seat 123 are formed of a flexible material, for example, an elastomer.

The vent hole 54 permits exhaustion of inks remaining in the cap 120 and permits flow of air into the cap 120 via the air tube 122 at the time of air suction to evacuate inside the cap 120. As air is taken into the vent hole 54 via the air tube 122, it is possible to prevent inks from leaking from the vent hole 54.

As shown in FIG. 12, a shaft 124 is protrusively provided on the outer side surface of the cap support member 121. A valve body 126 is rotatably attached to the shaft 124. A first spring member 125 which is, for example, a torsion coil spring, is attached to the valve body 126. The valve body 126 includes an annular-shaped support portion 127 and an extension plate 128 extending from the support portion 127. A projection 129 is formed at the periphery of the support portion 127 at a position opposite to the extension plate 128.

As the valve body 126 rotates counterclockwise in FIG. 12, a side 128a of the extension plate 128 abuts on the valve seat 123 of the air tube 122. Accordingly, the vent hole 54 is sealed via the air tube 122. As the valve body 126 rotates clockwise in FIG. 12, the side 128a of the extension plate 128 parts from the valve seat 123 of the air tube 122. Accordingly, air flows into the cap 120 passing through the air tube 122 and the vent hole 54.

The valve body 126 is normally urged in the counterclockwise direction by the first spring member 125. In the case where no external force is applied to the valve body 126, therefore, the side 128a of the extension plate 128 always abuts on the valve seat 123, sealing the vent hole 54. Further, in a case the where leftward force is applied to the projection 129 from the right side in FIG. 12, the extension plate 128 rotates clockwise about the shaft 124 against the elastic force of the first spring member 125 and parts from the valve seat 123. As a result, air flows into the cap 120 passing through the air tube 122 and the vent hole 54.

The cap 120 is connected to the cap support member 121 via a second spring member 130. The second spring member 130 urges the cap 120 in a direction to separate the cap 120 and the cap support member 121 from each other in the up and down direction.

As shown in FIG. 12, the cap 120 has a stop portion 131 extending upward of the cap 120. The cap support member 121 has an engage portion 132 which is open toward the end portion of the cap support member 121 and has a trapezoidal cross section. As the stop portion 131 of the cap 120 engages with the engage portion 132 of the cap support member 121, an increase in the distance between the cap 120 and the cap support member 121 is restricted.

Figure 13:
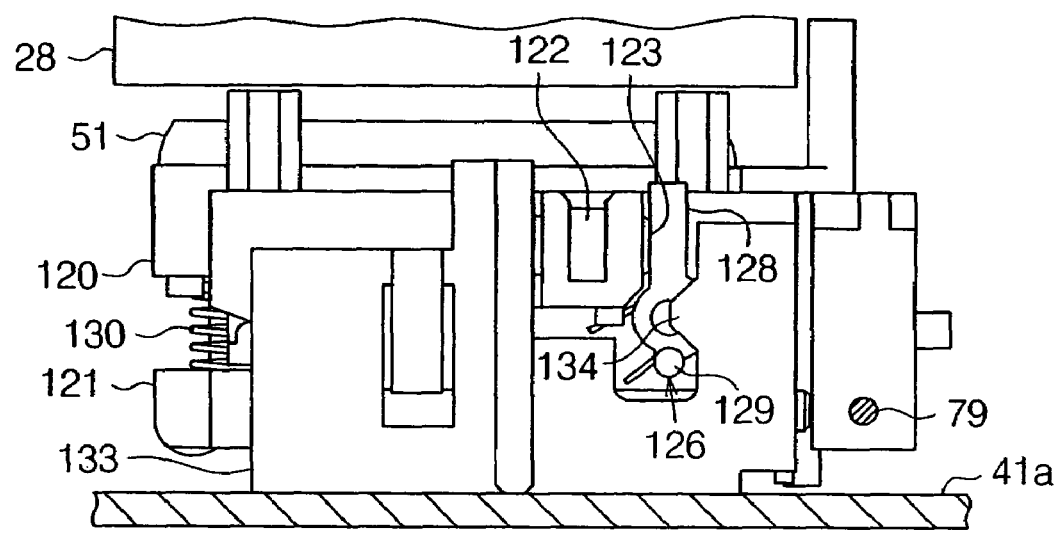
FIG. 13 is a side view showing a state where the nozzle protecting device in FIG. 12 is provided with a partition.

As shown in FIG. 13, a partition 133 is provided on a bottom 41a of the first retaining portion 41 (see FIG. 3). The partition 133 is arranged between the cap support member 121 and the third retaining portion 43 (see FIG. 3).

An abutment portion 134 as a pressing member is formed on the partition 133 at a position facing the valve body 126. In accordance with the up/down movement of the cap support member 121, the abutment portion 134 selectively abuts on or parts from the projection 129 of the valve body 126.

When the projection 129 abuts on the abutment portion 134, the projection 129 is pressed leftward from the right side in FIG. 12 by the abutment portion 134. Accordingly, the valve body 126 rotates clockwise about the shaft 124. As a result, the extension plate 128 of the valve body 126 is separated from the valve seat 123, releasing the inside of the cap 120 to air.

Figure 14:
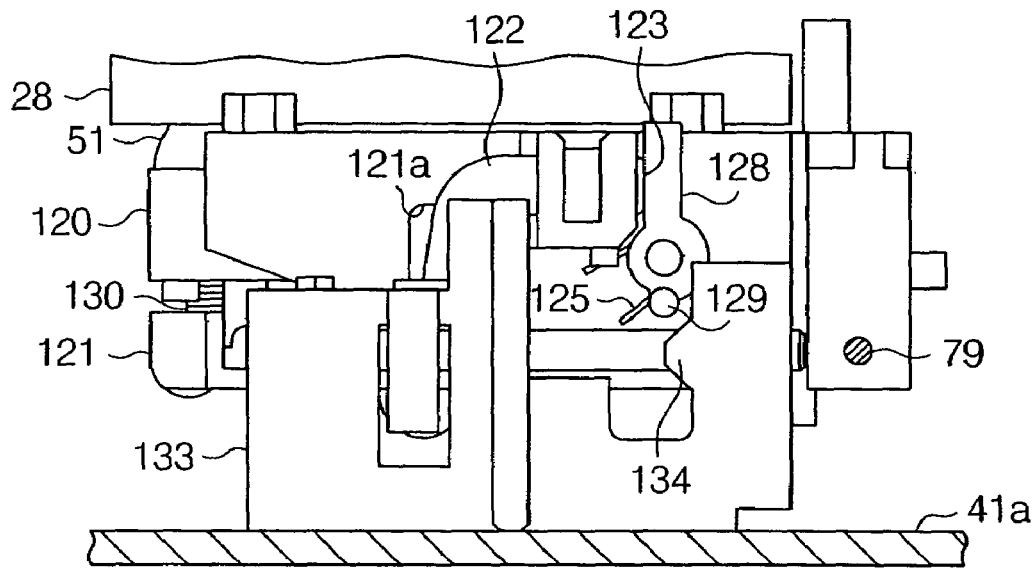
FIG. 14 is a diagram showing a state where a cap support member is moved uppermost in the nozzle protecting device in FIG. 12.

With the cap support member 121 moves to the topmost position as shown in FIG. 14, the abutment portion 134 is placed under the projection 129. In the case where no external force is applied to the cap support member 121, with the cap support member 121 moved to the lowermost position as shown in FIG. 13, on the other hand, the abutment portion 134 is placed above the projection 129.

The action of the nozzle protecting device 30 with the above-described structure will be described based on FIGS. 13 to 15.

First, when a process of carrying out a cleaning operation and flashing operation is executed in the recording apparatus 11, the carriage 16 is moved to the home position of the frame 12 as in the embodiment in FIGS. 1 to 11. Then, as shown in FIG. 13, the recording head 28 of the carriage 16 faces the cap 120 of the nozzle protecting device 30. In this state, the positioning member 79 of the cap support member 121 is engaged with the cam groove 86 of the cylindrical cam 35 shown in FIG. 6 at the lowest position; specifically, it abuts on the first surface 87 and the second surface 88 of the cam groove 86.

In FIG. 13, the distance between the cap 120 and the cap support member 121 is maximum, and the distance between the cap support member 121 and the partition 133 is minimum. The abutment portion 134 of the partition 133 is positioned above the projection 129 of the valve body 126. The extension plate 128 of the valve body 126 abuts on the valve seat 123 so that the vent hole 54 is closed via the air tube 122. In this state, even when the flashing operation is performed and the inks are ejected inside the cap 120, the inks do not leak from the vent hole 54.

In the case where the cleaning operation is performed, on the other hand, the positioning member 79 of the cap support member 121 moves upward while abutting on the second and third surfaces 88 and 89 of the cam groove 86 (see FIG. 6).

Then, with the upward movement of the positioning member 79, the cap support member 121 moves upward and the close-contact portion 51 of the cap 120 abuts on the recording head 28, covering the recording head 28. The recording head 28 restricts the upward movement of the cap 120 and elastically deforms the spring member 130 provided between the cap 120 and the cap support member 121, thereby decreasing the distance between the cap 120 and the cap support member 121.

At this time, the projection 129 moves upward of the abutment portion 134 of the partition 133 in accordance with the upward movement of the cap support member 121. Consequently, when a predetermined time elapses, the projection 129 of the valve body 126 abuts on the abutment portion 134 of the partition 133, causing air to flow into the cap 120. Thereafter, the projection 129 moves upward of the abutment portion 134 and parts from the abutment portion 134.

Subsequently, the distance between the cap 120 and the cap support member 121 reaches a minimum and the projection 129 is positioned above the abutment portion 134, as shown in FIG. 14. At this time, the extension plate 128 of the valve body 126 abuts on the valve seat 123 due to the elastic restoration of the spring member 125 and the vent hole 54 is closed via the air tube 122.

Thereafter, the rotation of the cylindrical cam 35 is stopped and as shown in FIG. 14, the nozzles of the recording head 28 are covered with the cap 120 and suction by the tube pump 37 is carried out with the extension plate 128 abutting on the valve seat 123. When the inside of the cap 120 is depressurized, inks in the ink cartridges 21 and 22 (see FIG. 1) flow inside the cap 120 via the nozzles of the recording head 28. Then, inks with increased viscosity in the vicinity of the nozzles, dust adhered to the nozzles, bubbles generated by replacement of the cartridges, or the like are exhausted to the outside via the ink tubes 53a and the cleaning operation is executed.

Thereafter, when suction by the tube pump 37 is stopped, the inks are retained inside the cap 120.

Subsequently, in the case where printing starts again from the state shown in FIG. 14, the cap support member 121 is lowered according to the operation of the cylindrical cam 35 as described in the embodiment in FIGS. 1 to 11. Then, the spring member 130 provided between the cap support member 121 and the cap 120 is elastically restored.

Figure 15:
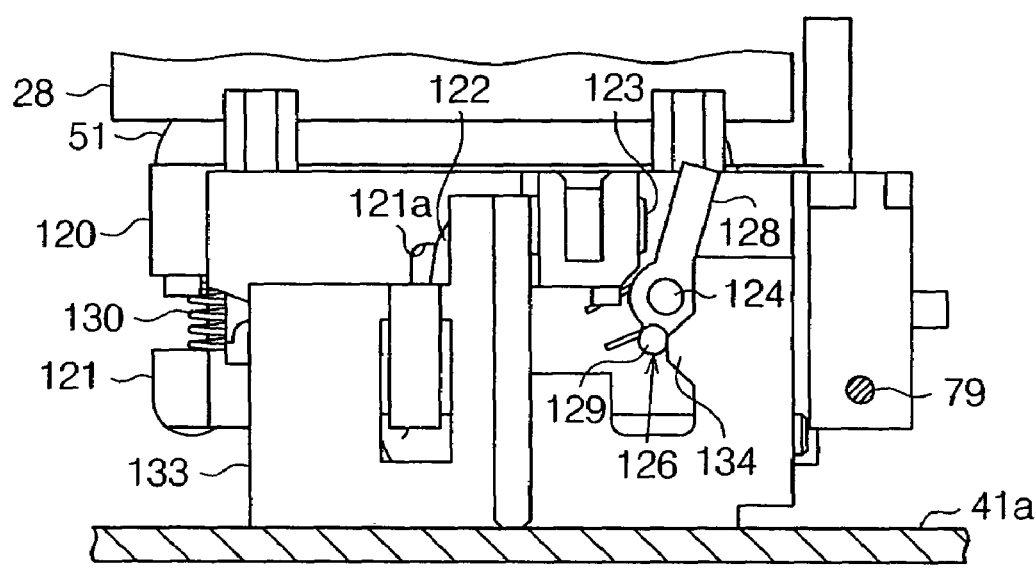
FIG. 15 is a diagram showing a state where a projection provided in the nozzle protecting device in FIG. 12 abuts on an abutment portion of the partition.

As a result, as shown in FIG. 15, with the cap 120 abutting on the recording head 28, the projection 129 of the valve body 126 moves downward and abuts on the abutment portion 134. Leftward force is applied to the projection 129 from the right side in the diagram by the abutment portion 134. Consequently, the valve body 126 is rotated clockwise in FIG. 15 about the shaft 124 as the rotational center and the valve seat 123 is separated from the extension plate 128 and air flows inside the cap 120.

The tube pump 37 is stopped with the roller 106 pressing against the ink tubes 53a as per the embodiment in FIGS. 1 to 11. Even if the extension plate 128 is separated from the valve seat 123 to set the vent hole 54 open via the air tube 122, therefore, the ink tubes 53a are pressed so that inks do not leak through the vent hole 54.

Thereafter, as shown in FIG. 15, suction by the tube pump 37 is carried out with the extension plate 128 separated from the valve seat 123. And, the inside of the cap 120 is depressurized. Then, air flows inside the cap 120 via the air tube 122 and the vent hole 54. Subsequently, the inks held inside the cap 120 are exhausted to the outside via the ink tubes 53a and so-called air suction is performed. As a result, the inside of the cap 120 is filled with air.

Thereafter, after suction by the tube pump 37 is stopped, the cap support member 121 is lowered according to the operation of the cylindrical cam as per the embodiment in FIGS. 1 to 11. Consequently, the projection 129 moves upward relative to the partition 133 and the extension plate 128 rotates counterclockwise about the shaft 124 in FIG. 12 due to the elastic restoration of the spring member 125 and abuts on the valve seat 123. When the distance between the cap 120 and the cap support member 121 reaches maximum, the cap 120 is separated from the recording head 28 as shown in FIG. 13. The abutment portion 134 is positioned above the projection 129 and outside the movable range of the projection 129 and is separated from the projection 129.

At this time, air suction is performed and the inks are not held inside the cap 120, so that even if the recording apparatus 11 is set in a state other than a horizontal state, the inks do not leak from inside the cap 120.

A third embodiment embodying the present invention will be described below with reference to FIGS. 16 to 23. It should be noted that the same symbols are given to similar portions to those of the recording apparatus 11 in FIG. 1 and their descriptions are omitted.

Figure 16:
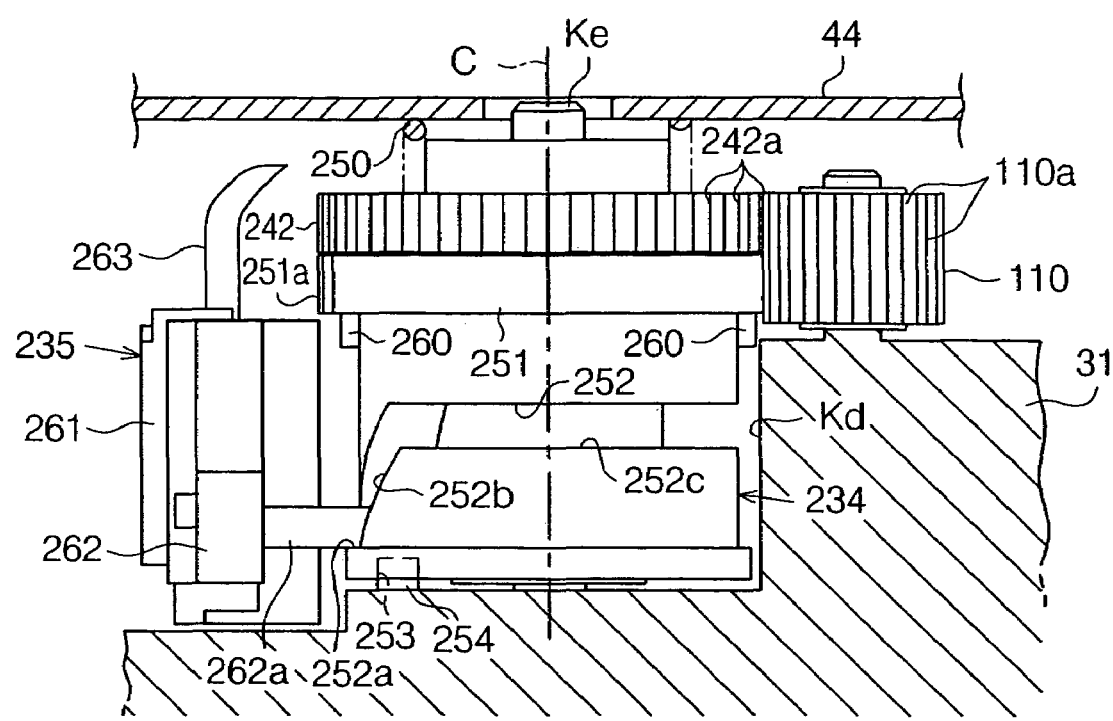
FIG. 16 is a front view of essential portions of a nozzle protecting device equipped in a recording apparatus according to a third embodiment embodying the present invention.

As shown in FIG. 16, a cylindrical cam 234 is supported inside a retaining portion Kd of the case 31 by a support portion Ke protruding at the center thereof. The cylindrical cam 234 is rotatable about the rotational axial center C of the support portion Ke. A driven gear 242 is provided above the cylindrical cam 234. The driven gear 242 is a spur gear having a plurality of teeth 242a formed around the entire circumferential surface at predetermined pitches a. The driven gear 242 rotates always in engagement with teeth 110a of the fourth gear 110. A compression spring 250 is provided between the driven gear 242 and the lid 44. One end portion of the compression spring 250 is pressed against the lid 44 and the other end portion is pressed against the driven gear 242, thus pressing the driven gear 242 downward toward the cylindrical cam 234. Therefore, the torque from the driven gear 242 is transmitted to the cylindrical cam 234 by friction.

A partially toothed gear 251 having a ring shape is provided at the upper end portion of the cylindrical cam 234 between the cylindrical cam 234 and the driven gear 242. A plurality of teeth 251a are formed on about one-half of the circumferential surface of the partially toothed gear 251. The plural teeth 251a are formed at the same pitches a as the driven gear 242 and engage with the teeth 110a of the fourth gear 110. The upper sides of the teeth 110a of the fourth gear 110 engage with the teeth 242a of the driven gear 242 and the lower sides engage with the teeth 251a of the partially toothed gear 251 at the same time.

Figure 20A:
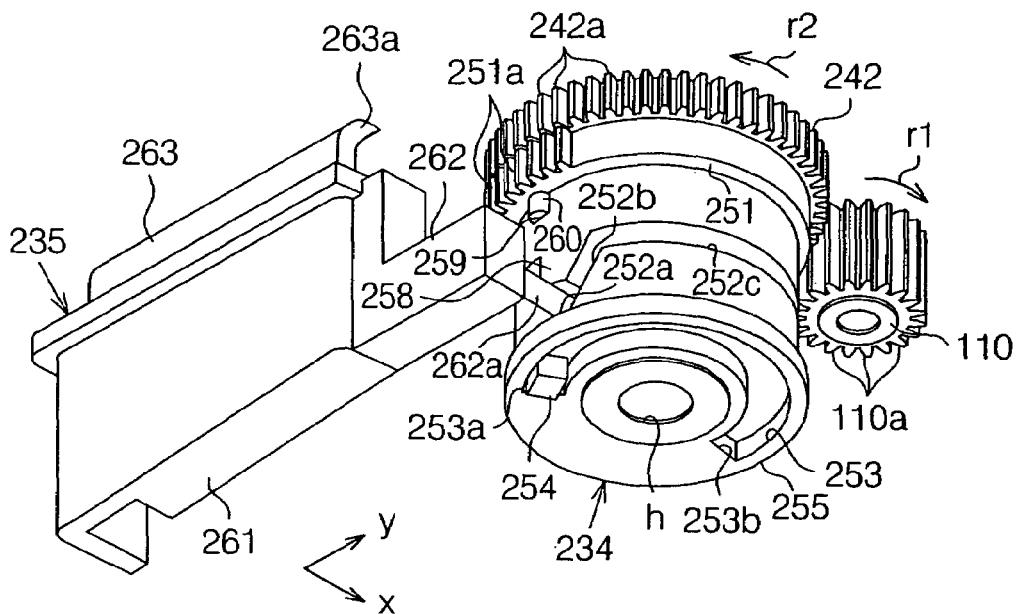
FIG. 20(a) is a perspective view of a cylindrical cam and a wiping apparatus according to the third embodiment as seen from the bottom side.
Figure 20B:
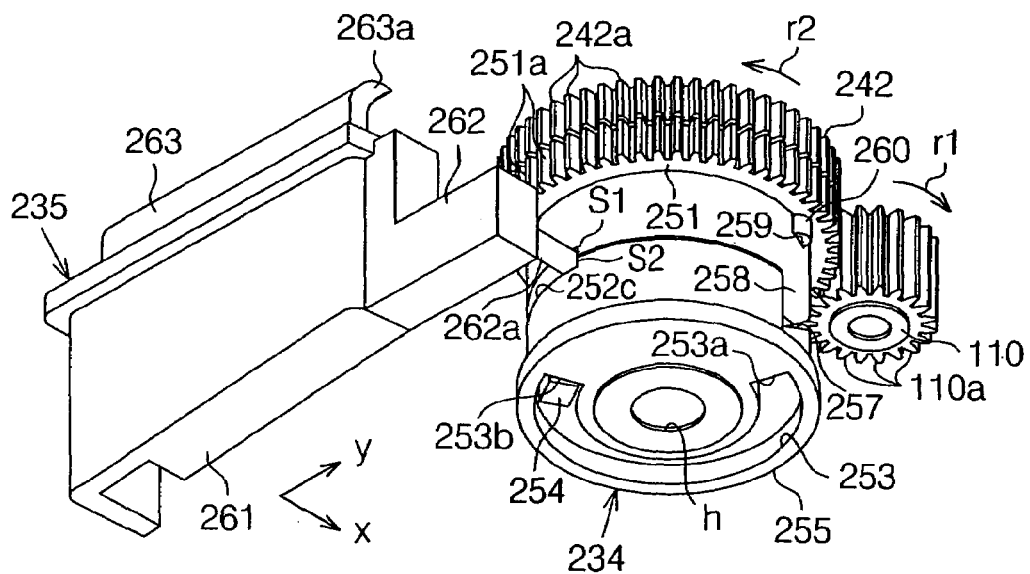
FIG. 20(b) is a perspective view of the cylindrical cam and the wiping apparatus according to the third embodiment as seen from the bottom side.
Figure 21:
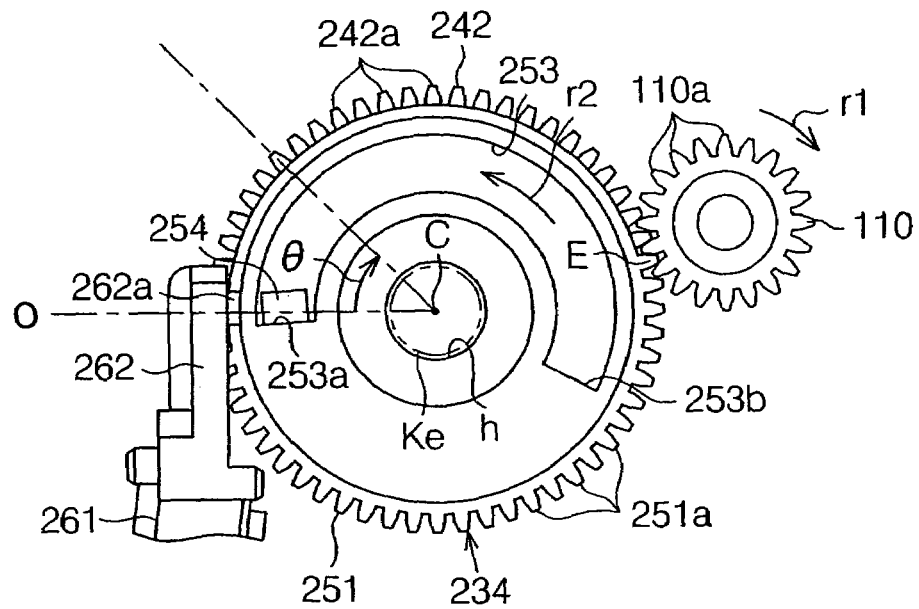
FIG. 21 is a bottom view of the cylindrical cam and what lies around it.
Figure 22:
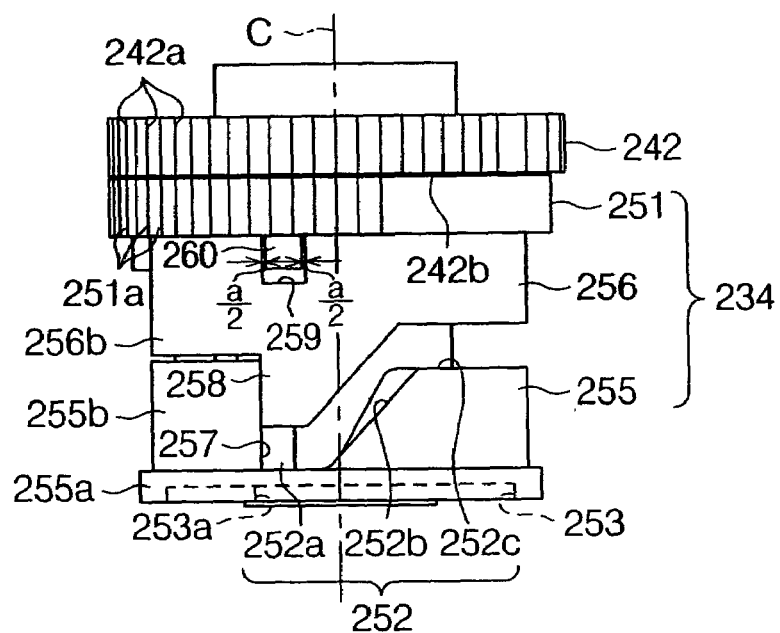
FIG. 22 is a front view of the cylindrical cam.

A cam groove 252 is formed in the circumferential surface of the cylindrical cam 234. As shown in FIG. 22, the cam groove 252 includes a first guide portion 252a extending along the circumferential direction at the lower portion of the cam groove 252, a second guide portion 252b extending obliquely upward from the first guide portion 252a and a third guide portion 252c extending in parallel along the circumferential direction from the second guide portion 252b. As shown in FIG. 20(a) to FIG. 21, a rotation restriction groove 253 having a center angle of about 200° and an arcuate shape is formed in the bottom of the cylindrical cam 234. The angle defined by lines connecting first and second end portions 253a and 253b of the rotation restriction groove 253 to the rotational axial center C of the support portion Ke is greater than 180 degrees. A stop member 254 is slidably engaged with the rotation restriction groove 253. The stop member 254 is fixed to the bottom of the retaining portion Kd of the case 31. When the cylindrical cam 234 rotates, therefore, the stop member 254 abuts on both end portions 253a and 253b of the rotation restriction groove 253 (see FIG. 20(a) to FIG. 21), thus restricting the rotation of the cylindrical cam 234.

Figure 23:
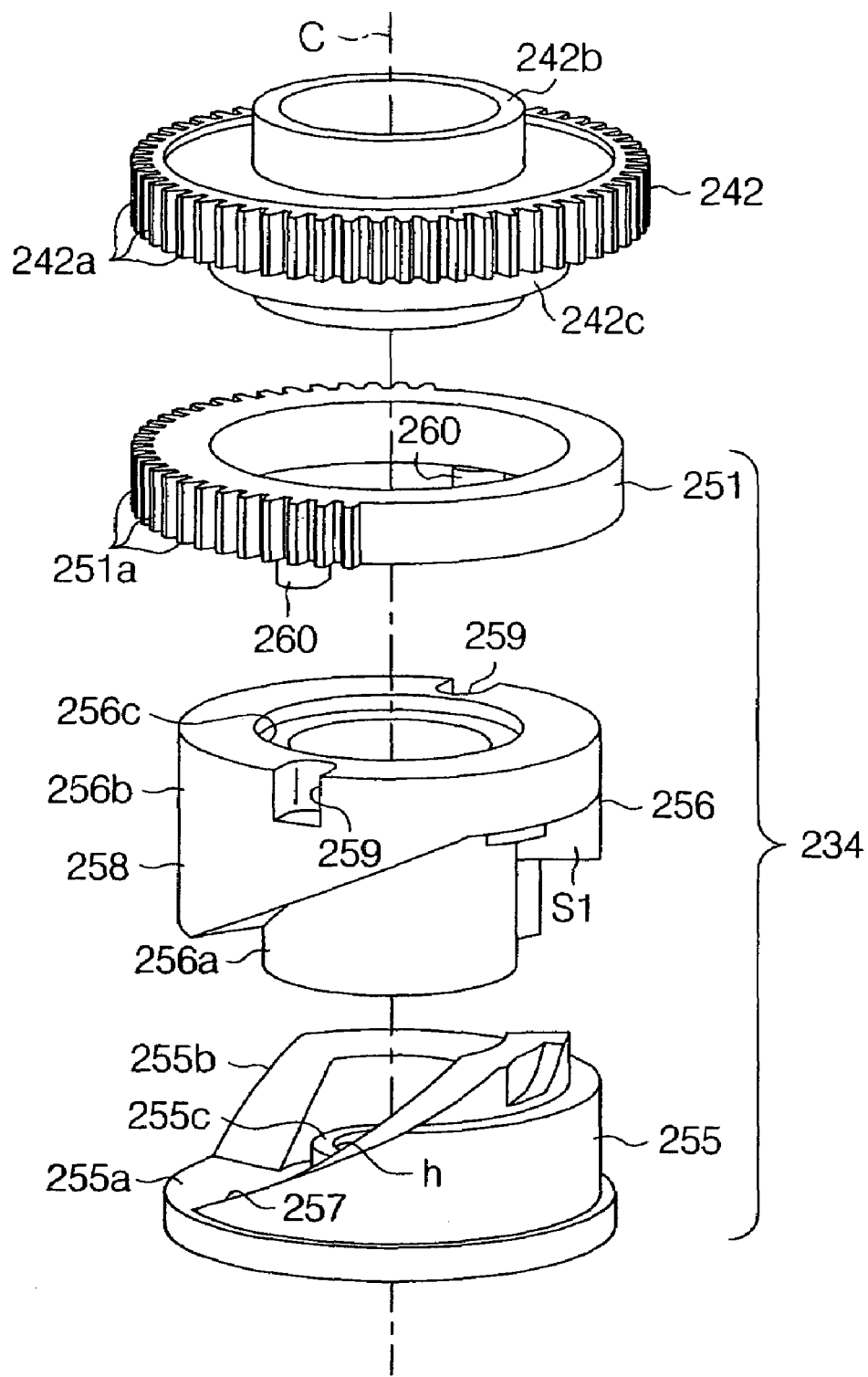
FIG. 23 is an exploded perspective view of the cylindrical cam.

Next, the structures of the cylindrical cam 234 and the driven gear 242 coaxial to the cylindrical cam 234 are described in detail based on FIGS. 22 and 23. The cylindrical cam 234 includes a first groove-forming member 255, a second groove-forming member 256 and the partially toothed gear 251. The first groove-forming member 255 and the second groove-forming member 256 are equivalent to the rotary member.

The first groove-forming member 255 has a disk-shaped base portion 255a. The rotation restriction groove 253 is formed at the bottom of the base portion 255a. A wall portion 255b extends upward from the top of the base portion 255a. The wall portion 255b has a cylindrical shape with a part cut away. A cutaway portion 257 is formed in the wall portion 255b positioned above the first end portion 253a of the rotation restriction groove 253. The cutaway portion 257 extends obliquely upward from the top of the base portion 255a. A first step portion S2 extending toward the driven gear 242 (see FIG. 20(b)) is formed at the wall portion 255b positioned above the second end portion 253b of the rotation restriction groove 253.

As shown in FIG. 23, a cylinder portion 255c apart from the wall portion 255b by a predetermined distance and concentric thereto is formed at the center of the first groove-forming member 255. A through hole h is formed in the center of the cylinder portion 255c and the support portion Ke of the case 31 penetrates through the through hole h.

The second groove-forming member 256 has a cylinder portion 256a. The cylinder portion 256a is fitted in the gap between the wall portion 255b of the first groove-forming member 255 and the cylinder portion 255c. A ring portion 256b shorter in the axial direction than the cylinder portion 256a is integrally formed on the circumferential surface of cylinder portion 256a. An extension portion 258 is provided at a part of the ring portion 256b. The axial length of the extension portion 258 is shorter than the axial length of the cylinder portion 256a. The extension portion 258 has an inclined portion having the same inclination angle as the inclined portion of the cutaway portion 257. The inclined portion of the extension portion 258 is inserted into the cutaway portion 257 of the first groove-forming member 255. Further, a second step portion S1 (see FIG. 6(b)) is formed at a part of the circumferential surface of the ring portion 256b.

When the cylinder portion 256a of the second groove-forming member 256 is inserted into the gap between the wall portion 255b of the first groove-forming member 255 and the cylinder portion 255c, therefore, the first groove-forming member 255 is disabled to rotate with respect to the second groove-forming member 256. When the extension portion 258 of the second groove-forming member 256 is inserted into the cutaway portion 257 of the first groove-forming member 255, a gap is formed between the extension portion 258 and the base portion 255a. This gap is equivalent to the first guide portion 252a. A gap is also formed between the inclined portion of the cutaway portion 257 and the inclined portion of the second groove-forming member 256. This gap is equivalent to the second guide portion 252b. As shown in FIG. 20(b), the step portion S2 of the first groove-forming member 255 becomes level with the step portion S1 of the second groove-forming member 256, forming an end wall portion for the third guide portion 252c. That is, as the first groove-forming member 255 is attached to the second groove-forming member 256, the cam groove 252 is defined and formed. The rotation restriction groove 253 is formed in an angular range approximately the same as the angle at which the cam groove 252 is defined and formed. According to this embodiment, therefore, the cylindrical cam 234 is rotatable only in the angular range.

A pair of recess portions 259 are provided at the upper end portion of the ring portion 256b of the second groove-forming member 256. Further, a ring-shaped groove 256c formed at the upper end of the second groove-forming member 256, radially inward of the positions of both recess portions 259 and radially outward of the cylinder portion 256a.

As shown in FIG. 21, the tooth 251a in the plural teeth 251a which is positioned at an end portion E is provided at a position where it nearly faces the fourth gear 110 when the stop member 254 abuts on the first end portion 253a of the rotation restriction groove 253, i.e., when the cleaning operation is initiated. At the same time as the fourth gear 110 rotates in the direction r1, the partially toothed gear 251 engaged with the fourth gear 110 rotates in the direction r2.

As shown in FIG. 22, a pair of projection portions 260 protruding downward are provided on the partially toothed gear 251 at positions facing each other. The individual projection portions 260 are engaged with the respective recess portions 259 of the second groove-forming member 256. Specifically, when the projection portions 260 are engaged with the respective recess portions 259, a gap equivalent to a half of one pitch a of the tooth 251a is formed between the circumferential surface of the projection portion 260 extending in the axial direction and the wall of the recess portion 259 which faces that circumferential surface and extends in the axial direction. That is, the partially toothed gear 251 can turn by the pitch a of the tooth 251a with respect to the second groove-forming member 256.

As shown in FIG. 23, a cylinder portion 242b is formed at the center portion of the driven gear 242 in such a way as to extend along the axial direction. The compression spring 250 (see FIG. 16) is fitted over the upper end portion of the cylinder portion 242b. The lower end portion of the cylinder portion 242b is fitted in the ring-shaped groove 256c of the second groove-forming member 256. A large-diameter portion 242c is provided between the driven gear 242 and the cylinder portion 242b. The large-diameter portion 242c is fitted in the inner hole of the partially toothed gear 251. Therefore, the driven gear 242 is rotatable with respect to the cylindrical cam 234 and rotates about the rotational axial center C of the cylindrical cam 234.

Figure 17:
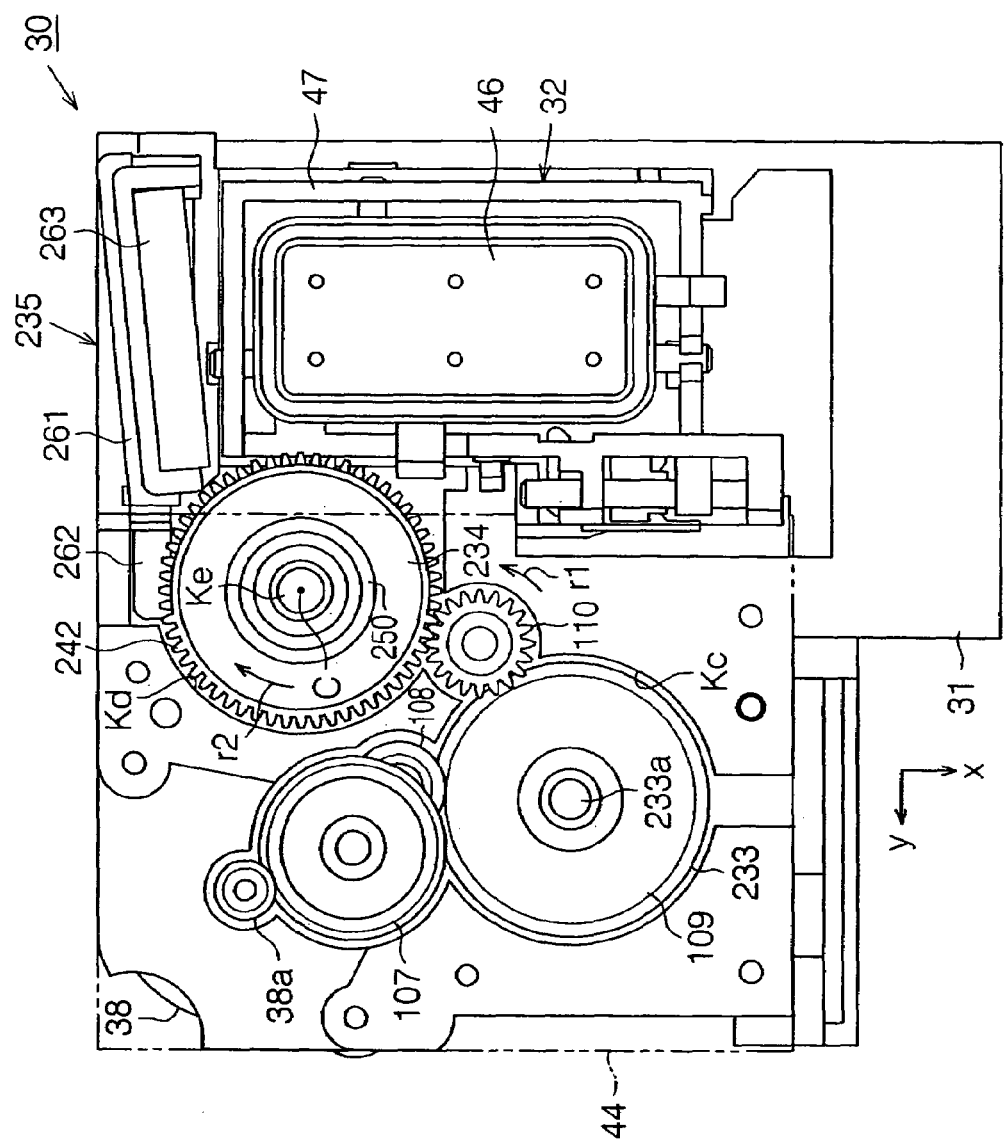
FIG. 17 is a plan view of the nozzle protecting device in FIG. 16.
Figure 18:
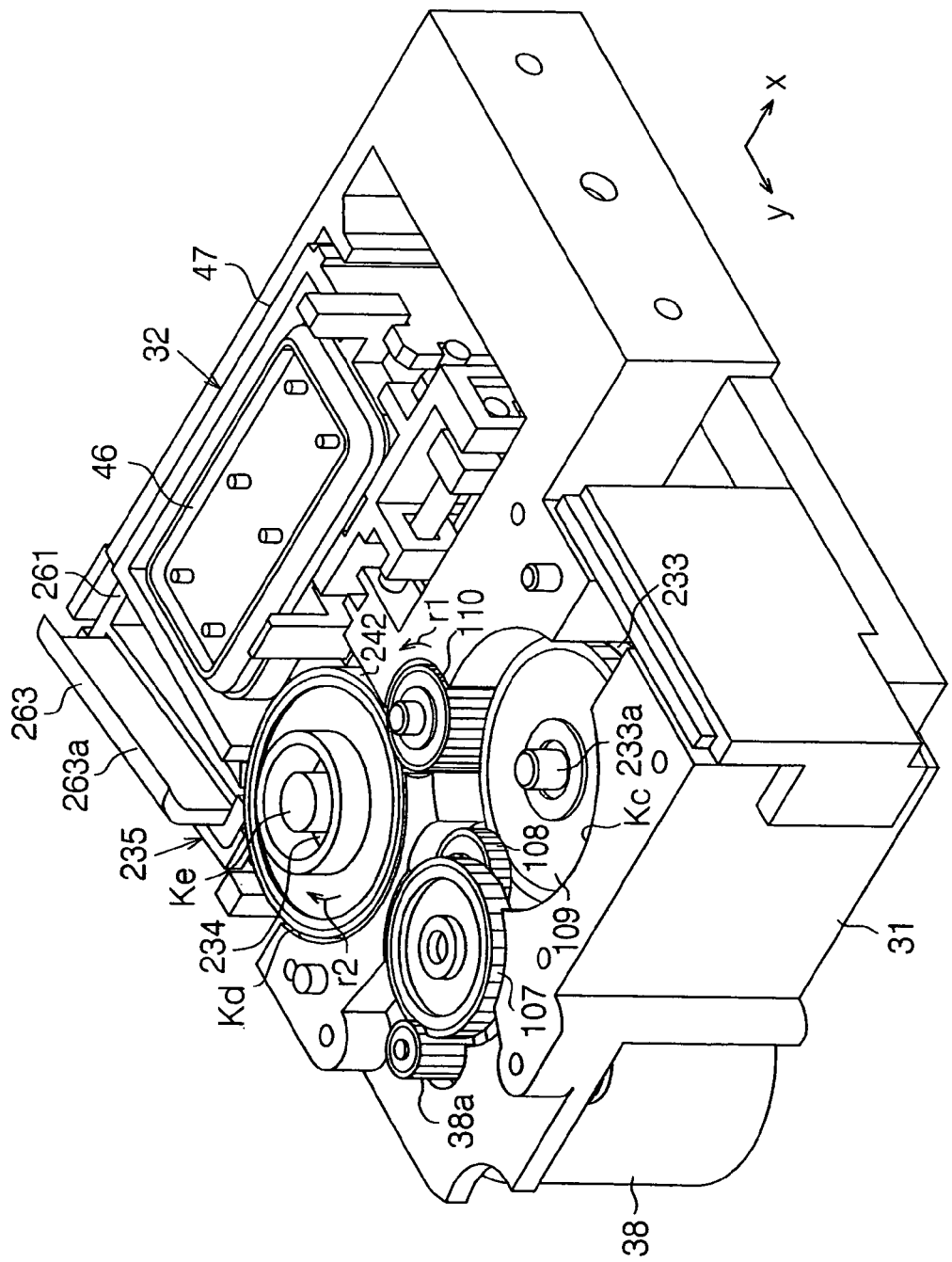
FIG. 18 is an outline perspective view of the nozzle protecting device as seen from the tube pump side.
Figure 19:
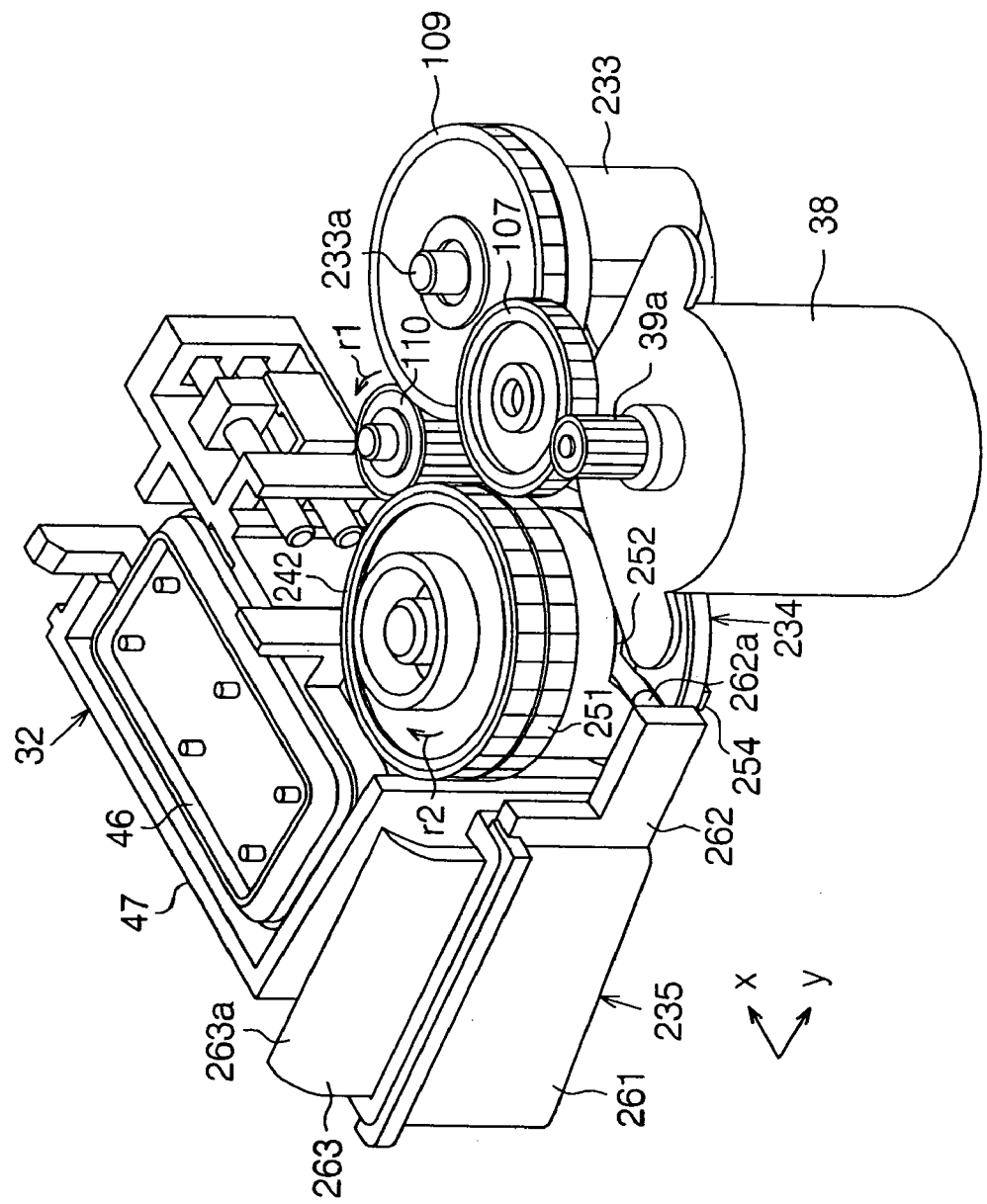
FIG. 19 is an outline perspective view of the nozzle protecting device as seen from the drive motor side.

As shown in FIGS. 17 to 19, the nozzle protecting device 30 has a wiping apparatus 235. The wiping apparatus 235 has a wiper support member 261 provided along the direction of the arrow y. The wiper support member 261 is supported on the case 31 in such a way as to be movable in the up and down direction of the case 31 and to be unmovable in the direction of the arrow y. A holding member 262 is formed extending from the lower portion of the side of the wiper support member 261 concerning the direction of the arrow y, as shown in FIGS. 16, 19, 20(a) and 20(b). As shown in FIGS. 20(a) and 20(b), a positioning member 262a is formed extending from the distal end of the holding member 262 in the direction of the arrow x. The positioning member 262a is slidably fitted in the cam groove 252 of the cylindrical cam 234.

As the cylindrical cam 234 is rotated by the drive motor 38, the holding member 262 is moved up and down by the positioning member 262a which slides in the guide portions 252a, 252b and 252c of the cam groove 252. That is, when the positioning member 262a slides in the first guide portion 252a, the positioning member 262a is guided to a position of non-action. When the positioning member 262a slides in the third guide portion 252c, the holding member 262 is guided to a position of action. Further, when the positioning member 262a slides in the second guide portion 252b, the holding member 262 is guided to a position between the position of non-action and the position of action.

Specifically, as shown in FIGS. 16, 19 and 20(a), when the stop member 254 abuts on the first end portion 253a of the rotation restriction groove 253 of the first groove-forming member 255, the fourth gear 110 faces the tooth 251a at the end portion E of the partially toothed gear 251 and the positioning member 262a is positioned at the position where it abuts on the end wall of the first guide portion 252a of the cam groove 252. In this state, therefore, the holding member 262 is positioned at the position of non-action. As the fourth gear 110 is rotated in the direction r1 from this state, the driven gear 242 and the partially toothed gear 251 rotate in the direction r2. Their rotation causes the cam groove 252 of the cylindrical cam 234 to rotate and the positioning member 262a slides to contact the third guide portion 252c from the first guide portion 252a of the cam groove 252 through the second guide portion 252b. With the movement of the positioning member 262a, the wiper support member 261 moves upward and reaches the position of action when the positioning member 262a slides to contact the third guide portion 252c. When the stop member 254 abuts on the first end portion 253b of the rotation restriction groove 253 by the rotation of the cylindrical cam 234, as shown in FIG. 20(b), the positioning member 262a abuts on the end wall (step portions S1, S2) of the third guide portion 252c of the cam groove 252. As the positioning member 262a moves to the third guide portion 252c from the first guide portion 252a of the cam groove 252 through the second guide portion 252b, the partially toothed gear 251 engages with the fourth gear 110 but the partially toothed gear 251 does not engage with the fourth gear 110 before the positioning member 262a reaches the end wall of the third guide portion 252c.

As the drive motor 38 is rotated reversely from the state shown in FIG. 20(b) to the state shown in FIG. 20(a), the positioning member 262a slides to contact the first guide portion 252a from the third guide portion 252c through the second guide portion 252b in the reverse order to the previously described order. As a result, the wiper support member 261 is lowered to the position of non-action from the position of action.

A wiping member 263 extending in the direction of the arrow y is fixed to the top of the wiper support member 261. The wiping member 263 is formed of an elastic material, such as rubber. A distal end 263a of the wiping member 263 is bent in the direction of the arrow x and cleans in such a way as to wipe off the inks adhered to the recording head 28. That is, when the wiper support member 261 moves upward to the position of action, the distal end 263a of the wiping member 263 is pressed against the recording head 28, which passes above, from below and wipes off inks adhered to the recording head 28.

The action of the recording apparatus 11 according to this embodiment will be described using FIGS. 16 to 20(b) and FIG. 1.

In the case where printing is finished and the cleaning operation of the recording head 28 is to be carried out, the recording apparatus 11 drives the carriage motor 18 to move the carriage 16 in the direction of the arrow x to the position where the carriage 16 faces the cap 46. At this time, the positioning member 262a of the wiper support member 261 is positioned at the first guide portion 252a of the cam groove 252, as shown in FIGS. 16, 19 and 20(b). Accordingly, even when the carriage 16 passes over the wiping member 263 in the direction x, the distal end 263a of the wiping member 263 does not abut on the recording head 28 of the carriage 16. The tooth 251a at the end portion E of the partially toothed gear 251 faces the fourth gear 110. Further, the stop member 254 abuts on the first end portion 253a of the rotation restriction groove 253.

When the carriage 16 arrives at the position facing the cap 46, the recording apparatus 11 stops driving the carriage motor 18 and rotates the drive motor 38 forward. When the drive motor 38 is rotated forward, the drive gear 38a is rotated and its torque is transmitted to the fourth gear 110 via the individual first to third gears 107 to 109. The fourth gear 110 is rotated in the direction r1 and the driven gear 242 which engages with the fourth gear 110 is rotated in the direction r2. When the driven gear 242 starts rotating in the direction r2, the driven gear 242 is pressed downward and the driven gear 242 slides to contact the partially toothed gear 251, so that the torque of the driven gear 242 is transmitted to the partially toothed gear 251 by frictional force so that the partially toothed gear 251 tries to rotate. Further, as the teeth 251a of the partially toothed gear 251 are at the position facing the fourth gear 110, the teeth 251a of the partially toothed gear 251 engage with the fourth gear 110.

As a result, upon reception of the torque from the fourth gear 110, the partially toothed gear 251 is rotated in the direction r2. As the partially toothed gear 251 rotates, the partially toothed gear 251 rotates with respect to the second groove-forming member 256 until its projection portion 260 abuts on the wall of the recess portion 259 in the direction r2, then rotates together with the first groove-forming member 255 and the second groove-forming member 256. That is, the cylindrical cam 234 is rotated in the direction r2 and the cam groove 252 rotates. Accordingly, the positioning member 262a of the wiper support member 261 reaches the third guide portion 252c through the second guide portion 252b from the first guide portion 252a of the cam groove 252 where it has been fitted, causing the wiping member 263 to move upward.

As the positioning member 262a reaches the third guide portion 252c and the cylindrical cam 234 makes about a half turn, the teeth 251a of the partially toothed gear 251 do not engage with the fourth gear 110. As the driven gear 242 which slides to contact the partially toothed gear 251 keeps rotating, the torque of the driven gear 242 is converted to frictional force and is transmitted to the partially toothed gear 251, causing the cylindrical cam 234 to further rotate. And, when the stop member 254 abuts on the end portion 253b of the rotation restriction groove 253 of the cylindrical cam 234, as shown in FIG. 20(b), the rotation of the cylindrical cam 234 in the direction r2 is stopped.

The cap support member 47 is moved upward by the elevation mechanism, which is driven by torque transmitted from the driven gear 242, and the cap 46 guided is to the position of action and tightly contacts the recording head 28. Then, a tube pump 233 is driven via the third gear 109, generating negative pressure in the tightly closed space of the recording head 28. Accordingly, inks with high viscosity, which cause clogging in the nozzles of the recording head 28, are exhausted to the waste liquid tank 40.

When the drive motor 38 is switched to the reverse rotation thereafter, the fourth gear 110 rotates in the direction opposite to the direction r1. This causes the driven gear 242 to rotate in the direction opposite to the direction r2. The torque of the driven gear 242 is converted to frictional force which is transmitted to the partially toothed gear 251 so that the partially toothed gear 251 rotates in the direction opposite to the direction r2 in a state where it does not engage with the fourth gear 110. At this time, the partially toothed gear 251 rotates until the projection portion 260 abuts on the wall of the recess portion 259 in the direction opposite to the direction r2, and then rotates together with the first groove-forming member 255 and the second groove-forming member 256. That is, the cylindrical cam 234 rotates in the direction opposite to the direction r2.

With the positioning member 262a of the holding member 262 positioned in the third guide portion 252c and the wiping member 263 being at the position of action, the drive motor 38 is stopped. At this time, the cap support member 47 is lowered by the elevation mechanism and the cap 46 is positioned at the position of non-action so that the carriage 16 becomes movable. Then, the recording apparatus 11 drives the carriage motor 18 to move the carriage 16 in the direction opposite to the direction of the arrow x from above the cap 46. Then, the carriage 16 abuts on the wiping member 263 and moves in the direction opposite to the direction of the arrow x so that the wiping member 263 is bent by the carriage 16, which moves, and then its distal end 263a abuts on the recording head 28. As the carriage 16 further moves in the direction of the arrow x, the wiping member 263 moves with respect to the recording head 28 and performs cleaning in such a way as to wipe the entire surface of the recording head 28.

When the recording head 28 passes over the wiping member 263 and cleaning of the recording head 28 by the wiping member 263 is finished in this way, the recording apparatus 11 rotates the drive motor 38 reversely again. Therefore, the fourth gear 110 rotates again in the direction opposite to the direction r1 and the driven gear 242 engaging with the fourth gear 110 rotates in the direction opposite to the direction r2 so that upon reception of the torque from the driven gear 242, the partially toothed gear 251 rotates in the direction opposite to the direction r2. The teeth 251a of the partially toothed gear 251 rotate to the position facing the fourth gear 110 to try to engage with the fourth gear 110.

In the case where the teeth 242a of the driven gear 242 are not aligned with the teeth 251a of the partially toothed gear 251 at this time, i.e., in the case where the teeth 251a of the partially toothed gear 251 do not smoothly engage with the teeth 110a of the fourth gear 110, the teeth 251a of the partially toothed gear 251 are filliped by the torque of the teeth 110a of the fourth gear 110. At this time, the load of the partially toothed gear 251 is applied to the partially toothed gear 251 and the fourth gear 110. There is a gap between the projection portion 260 of the partially toothed gear 251 and the recess portion 259 of the second groove-forming member 256 and the large-diameter portion 242c of the driven gear 242 is fitted in the partially toothed gear 251. Accordingly, even when the second groove-forming member 256 under the partially toothed gear 251 and the driven gear 242 above the partially toothed gear 251 are rotating, the partially toothed gear 251 alone stops temporarily. That is, the partially toothed gear 51 rotates in the direction r1 with respect to the driven gear 242, which is rotating in the direction opposite to the direction r1 always in engagement with the fourth gear 110, and the second groove-forming member 256 which rotates due to inertial force.

Accordingly, only the partially toothed gear 251 stops temporarily and is so adjusted to smoothly engage with the teeth 110a of the fourth gear 110. When the partially toothed gear 251 is aligned with the teeth 242a of the driven gear 242, it smoothly engages with the fourth gear 110. Accordingly, the partially toothed gear 251 receives the torque from the fourth gear 110 via the tooth 251a and the torque of the driven gear 242 positioned above and rotates in the direction opposite to the direction r1. As the cylindrical cam 234 rotates with the rotation of the partially toothed gear 251, the positioning member 262a fitted in the third guide portion 252c of the cam groove 252 moves along the second guide portion 252b of the cam groove 252 and is guided to the first guide portion 252a. Therefore, the wiping member 263 of the wiping apparatus 235 moves downward and the positioning member 262a reaches the first guide portion 252a of the cam groove 252 as shown in FIGS. 16, 19, 20(a) and 21. The stop member 254 abuts on the first end portion 253a of the rotation restriction groove 253, restricting the rotation of the cylindrical cam 234, so that the cylindrical cam 234 stops rotating in the direction opposite to the direction r1. Thereafter, the rotation of the drive motor 38 is stopped.

The present embodiment has the following advantages.

When the positioning member 262a moves to the third guide portion 252c from the first guide portion 252a through the second guide portion 252b or moves to the first guide portion 252a from the third guide portion 252c through the second guide portion 252b, the partially toothed gear 251 engages with the fourth gear 110 and receives drive force. Even if inks are adhered to the partially toothed gear, increasing the load, therefore, the positioning member 262a reliably receives the torque from the fourth gear 110 when moving to the second guide portion 252b. It is therefore possible to reliably rotate the cylindrical cam 234 and ensure the elevation of the wiping member 263.

The driven gear 242 provided above the partially toothed gear 251 is pressed toward the partially toothed gear 251 by the compression spring 250, so that the torque of the driven gear 242 is converted to frictional force and is transmitted to the partially toothed gear 251 by the frictional force. Therefore, when the partially toothed gear 251, even disengaged from the fourth gear 110, is rotated reversely, the cylindrical cam 234 is rotated upon reception of rotation force from the driven gear 242 and the partially toothed gear 251 tries to engage with the fourth gear 110. At this time, the cylindrical cam 234 keeps receiving the torque of the driven gear 242, so that when the partially toothed gear 251 does not smoothly engage with the fourth gear 110, the partially toothed gear 251 stops regardless of the rotation of the second groove-forming member, which rotates upon reception of frictional force from the driven gear 242. That is, as the partially toothed gear 251 rotates with respect to the second groove-forming member 256, the partially toothed gear 251 can smoothly engage with the fourth gear 110 with a small load.

The partially toothed gear 251 can turn by a gap (by one pitch a) between the recess portion 259 and the projection portion 260 with respect to the second groove-forming member 256. With the partially toothed gear 251 not in smooth engagement with the fourth gear 110, therefore, the partially toothed gear 251 is filliped in accordance with the rotation of the fourth gear 110 and the partially toothed gear 251 moves with respect to the other members (first and second groove-forming members 255 and 256) of the cylindrical cam 234. Accordingly, the drive motor 38 is stopped regardless of the movements of the first groove-forming member 255 and the second groove-forming member 256 and the position of the teeth 251a of the partially toothed gear 251 is adjusted in such a way that the partially toothed gear 251 engages with the fourth gear 110 by the torque from the fourth gear 110. At this time, the load of the partially toothed gear 251 alone, not the entire load of the cylindrical cam 234, is applied to the fourth gear 110. Therefore, the partially toothed gear 251 can be smoothly engaged with the fourth gear 110 with a small load. As the partially toothed gear 251 engages with the fourth gear 110 smoothly without a large load applied to the partially toothed gear 251, therefore, the partially toothed gear 251 can have an extended life.

As shown in FIG. 23, the ring-like partially toothed gear 251 becomes lighter as compared with a gear having, for example, a disk shape. It is therefore possible to make the load from the engagement of the partially toothed gear 251 with the fourth gear 110 smaller. The partially toothed gear 251 can thus be engaged with the fourth gear 110 smoothly and can be made to have a longer life.

The partially toothed gear 251 is rotatable with respect to the driven gear 242. When the position of the tooth 251a is adjusted to engage the partially toothed gear 251 with the fourth gear 110, therefore, the partially toothed gear 251 can be stopped irrespective of the rotational state of the driven gear 242. Thus, the load at the time the partially toothed gear 251 engages with the fourth gear 110 can be reduced.

As shown in FIG. 22, the gap between the projection portion 260 and the recess portion 259 is set to one pitch of the teeth 251a of the partially toothed gear 251, so that the partially toothed gear 251 can rotate by one pitch with respect to the second groove-forming member 256. If the partially toothed gear 251 can rotate by at least one pitch, the teeth 251a of the partially toothed gear 251, regardless of the position, can be adjusted to engage with the teeth 110a of the fourth gear 110. Because the gap between the projection portion 260 and the recess portion 259 becomes the rotational angle loss with respect to the second groove-forming member 256 of the partially toothed gear 251, it is better if the gap is smaller. By setting the gap between the projection portion 260 and the recess portion 259 to one pitch of the teeth 251a of the partially toothed gear 251, therefore, the rotational angle loss can be minimized and the teeth 251a of the partially toothed gear 251 can smoothly be engaged with the teeth 110a of the fourth gear 110 without applying a large load.

The partially toothed gear 251 of the cylindrical cam 234 can smoothly engage with the fourth gear 110 with a small load and can reliably rotate the cylindrical cam 234 upon reception of the drive force from the fourth gear 110. Therefore, the positioning member 262a inserted in the cam groove 252 formed in the cylindrical cam 234 can surely be guided to the individual guide portions 252a, 252b and 252c to reliably carry out elevation of the wiper support member 261 over a long period of time. As a result, the recording head 28 can be wiped clean reliably over a long period of time by the wiping member 263 and the nozzle protecting device 30 can carry out an adequate cleaning operation for a long period of time.

As the nozzle protecting device 30 performs an adequate cleaning operation for a long period of time, the recording head 28 can be kept in good condition over a long period of time. Therefore, the recording apparatus 11 can discharge the individual inks from the ink cartridges 21 and 22 at a predetermined timing and print a clear image.

As the projection portions 260 formed on the partially toothed gear 251 are fitted in the recess portions 259 formed in the second groove-forming member 256, the partially toothed gear 251 is provided on the cylindrical cam 234. Therefore, the partially toothed gear 251 can be provided on the cylindrical cam 234 with a simple structure in such a way that the partially toothed gear 251 is rotatable within a predetermined range with respect to the second groove-forming member 256.

The cam groove 252 that guides the positioning member 262a, which determines the elevation position of the wiping member 263, in the up and down direction is formed on the cylindrical cam 234. It is therefore possible to elevate the wiping member 263 via the positioning member 262a by the rotation of the cylindrical cam 234 with a simple structure.

The driven gear 242, which engages with the fourth gear 110 and rotates about the rotational axial center C, is provided in such a way as to be aligned with the partially toothed gear 251. This can reduce the space needed for the arrangement of the driven gear 242. The fourth gear 110 whose lower side engages with the partially toothed gear 251 and whose upper side engages with the driven gear 242 has such a shape that the upper side and lower side have the same diameter. In other words, the fourth gear 110 need not be formed into a complex shape so that the structure can be simplified.

The rotation restriction groove 253 of the cylindrical cam 234 restricts the cylindrical cam 234 in such a way that the cylindrical cam 234 does not rotate over a predetermined range. Even if the cylindrical cam 234 receives, for example, the torque from the driven gear 242, therefore, it does not rotate over the predetermined range and malfunction. Even if the drive motor 38 keeps rotating to drive the tube pump 233, therefore, the wiper support member 261 can be elevated at a predetermined timing.

Figure 24:
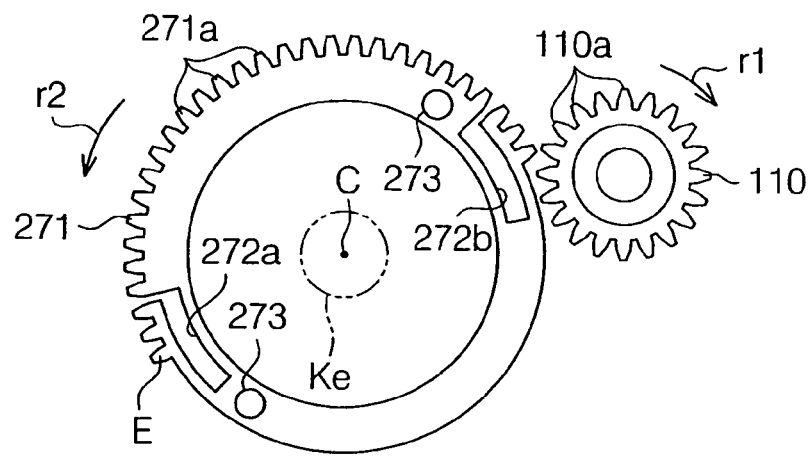
FIG. 24 is a bottom view of a partially toothed gear of a cylindrical cam according to a fourth embodiment.
Figure 25:
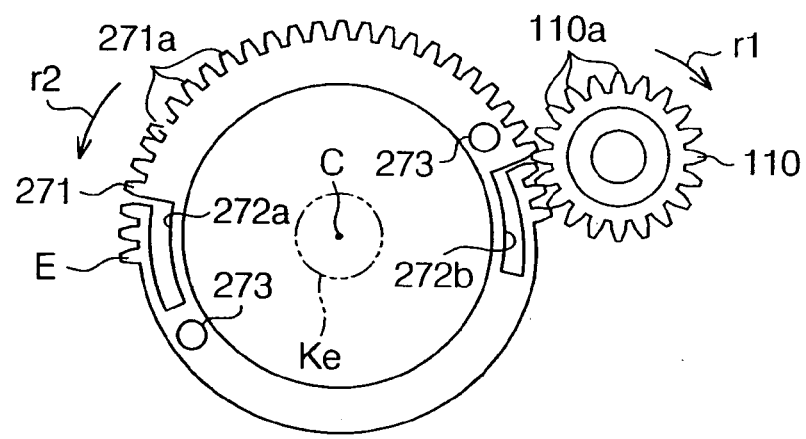
FIG. 25 is a bottom view of the partially toothed gear of the cylindrical cam in FIG. 24.
Figure 26:
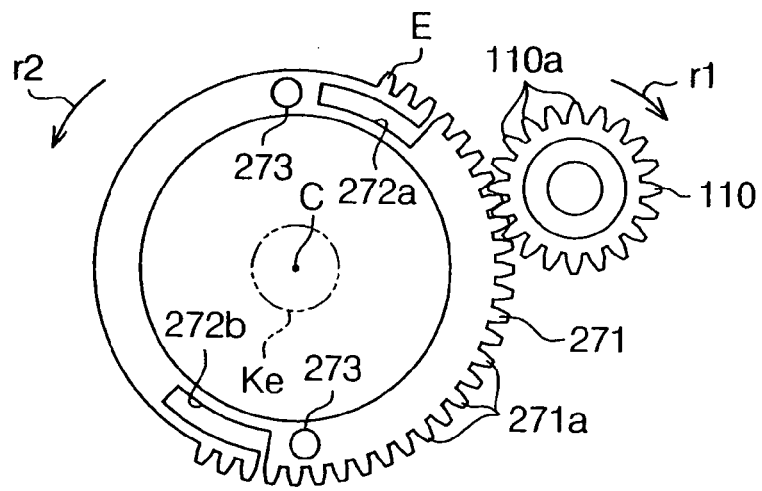
FIG. 26 is a bottom view of the partially toothed gear of the cylindrical cam in FIG. 24.

A fourth embodiment embodying the present invention will be described below based on FIGS. 24 to 26. FIGS. 24 to 26 are bottom views for explaining a partially toothed gear 271 according to this embodiment.

Like the partially toothed gear 251 in the embodiment in FIGS. 16 to 23, the partially toothed gear 271 having a ring-like shape is provided on the second groove-forming member 256 of the cylindrical cam 234 in such a way as to be aligned with the driven gear 242 and rotate about the rotational axial center C. Teeth 271a are formed on only about half the circumferential surface of the partially toothed gear 271. The teeth 271a are formed at the same pitches a as the driven gear 242 and engage with the fourth gear 110. The upper sides of the teeth 110a of the fourth gear 110 engage with the teeth 242a of the driven gear 242 and the lower sides engage with the teeth 271a of the partially toothed gear 271 at the same time.

Two cutaway portions 272a and 272b are formed on the circumferential portion of the partially toothed gear 271 radially inward of the teeth 271a in such a way as to respectively correspond to both end portions of the teeth 271a (three teeth 271a at both end portions). The cutaway portions 272a and 272b allow for bending of the three teeth 271a in the direction of the rotational axial center C of the partially toothed gear 271. Specifically, at the time the partially toothed gear 271 engages with the fourth gear 110, when the threads of the teeth 110a of the fourth gear 110 abut on the threads of the teeth 271a, the cutaway portions 272a and 272b cause the teeth 271a to be bent toward the center of the partially toothed gear 271.

The teeth 271a which are positioned at the end portion E where the teeth 271a of the partially toothed gear 271 shown in FIG. 24 are formed at such a position as to approximately face the fourth gear 110 at the time the cleaning operation in which the stop member 254 abuts on the end portion 253a of the rotation restriction groove 253 starts. That is, as the fourth gear 110 rotates in the direction r1, the teeth 271a of the partially toothed gear 271 soon engages and the partially toothed gear 271 rotates in the direction r2.

The partially toothed gear 271 has two projection portions 273 constructed like the projection portions 260 formed on the partially toothed gear 251 in the embodiment in FIGS. 16 to 23. Each projection portion 273 engages with the associated recess portion 259 of the second groove-forming member 256. That is, the partially toothed gear 271 can rotate by the pitch a of the teeth 271a with respect to the second groove-forming member 256 as per the embodiment in FIGS. 16 to 23.

With the above-described structure, the driven gear 242 is aligned with the partially toothed gear 271 so that the driven gear 242 can rotate with respect to the cylindrical cam 234 and rotates about the rotational axial center C of the cylindrical cam 234.

The action of the partially toothed gear 271 will be described next.

When the drive motor 38 is switched to the reverse rotation from the state where the partially toothed gear 271 is not engaged with the fourth gear 110, the fourth gear 110 rotates in the direction opposite to the direction r1, as shown in FIG. 24. Upon reception of the torque from the fourth gear 110 via the driven gear 242, the partially toothed gear 271 rotates in the direction opposite to the direction r2. The teeth 271a of the partially toothed gear 271 tries to rotate to the position facing the fourth gear 110 and engage with it.

In the case where the threads of the partially toothed gear 271 at the position facing the fourth gear 110 abut on the threads of the teeth 110a of the fourth gear 110 but are not in alignment at this time, the teeth 271a are bent toward the rotational axial center C by the cutaway portion 272b as shown in FIG. 25. With the rotation of the fourth gear 110, the threads of the teeth 271a and the threads of the teeth 110a which are in abutment with the teeth 271a start shifting and the teeth 271a eventually engage with the teeth 110a. And, the partially toothed gear 271 rotates in the direction opposite to the direction r2 as shown in FIG. 26.

As the teeth 271a are bent by the cutaway portion 272b, the partially toothed gear 271 can smoothly engage with the fourth gear 110.

The present embodiment has the following advantages in addition to the advantages of the embodiment in FIGS. 16 to 23.

The two cutaway portions 272a and 272b are formed on the circumferential portion of the partially toothed gear 271. They can bend the teeth 271a even if the threads of the teeth 271a abut on the threads of the teeth 110a when the partially toothed gear 271 engages with the fourth gear 110, thereby reducing the load on the partially toothed gear 271 and the fourth gear 110 so that smooth engagement can take place. As a result, the partially toothed gear 271 and the fourth gear 110 can have longer lives. Further, the formation of the cutaway portions 272a and 272b can provide the teeth 271a of the partially toothed gear 271 with flexibility without complicating the structure.

As the partially toothed gear 271 of the cylindrical cam 234 bends the teeth 271a, it can engage with the fourth gear 110 smoothly with a smaller load, and with the engagement, the partially toothed gear 271 can receive the drive force from the fourth gear 110 and reliably rotate the cylindrical cam 234. It is therefore possible to surely guide the positioning member 262a inserted in the cam groove 252 formed in the cylindrical cam 234 to the individual guide portions 252a, 252b and 252c to reliably execute elevation of the wiper support member 261 over a long period of time. Consequently, the recording head 28 can reliably be wiped clean with the wiping member 263 for a long period of time. Accordingly, the nozzle protecting device 30 can carry out an adequate cleaning operation for a long period of time.

A recording apparatus 311 according to a fifth embodiment of the present invention will be described below based on FIGS. 27 to 32. The recording apparatus 311 in the present embodiment has an elevation mechanism which elevates the guide member 15 and a cylindrical cam 334 which differs in structure from the cylindrical cam 234, as compared with the structure of the recording apparatus 11 in FIGS. 16 to 23.

Figure 27:
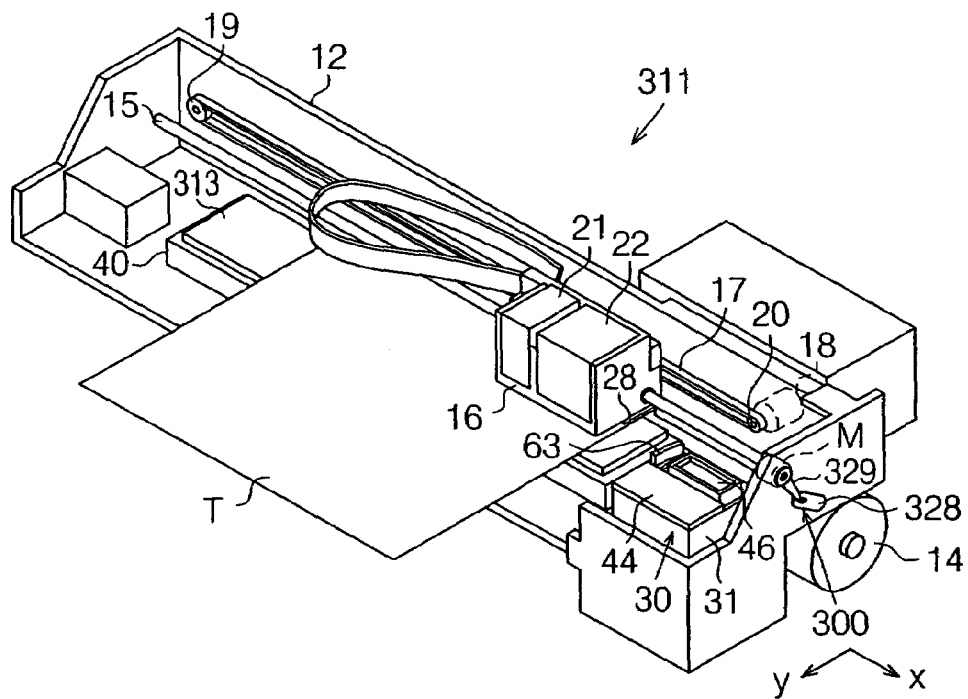
FIG. 27 is a perspective view of a recording apparatus according to a fifth embodiment of the present invention.

As shown in FIG. 27, the recording apparatus 311 has a platen 313 which extends in the direction of the arrow x and has a flat surface. The platen 313 is a support to support a target T, such as ordinary paper or a CD-ROM.

The recording apparatus 311 has an unillustrated thickness sensor in the vicinity of an unillustrated drive roller which is driven by the feed motor 14. The thickness sensor detects whether the target T fed to the recording apparatus 311 is thick or not.

Figure 28A:
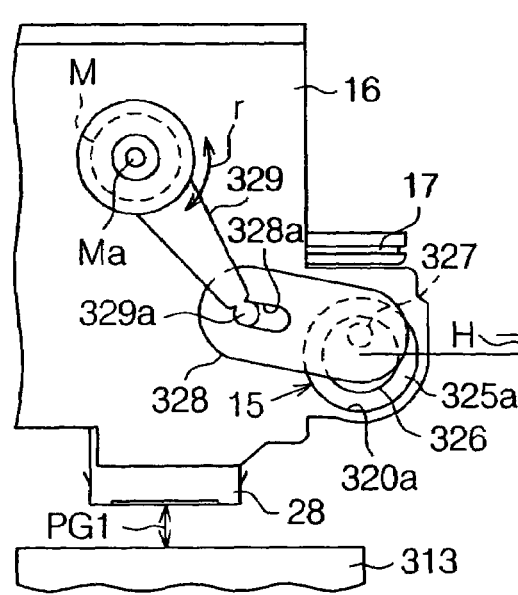
FIG. 28(a) is a side view showing a gap between a platen and a recording head equipped in the recording apparatus in FIG. 27.
Figure 28B:
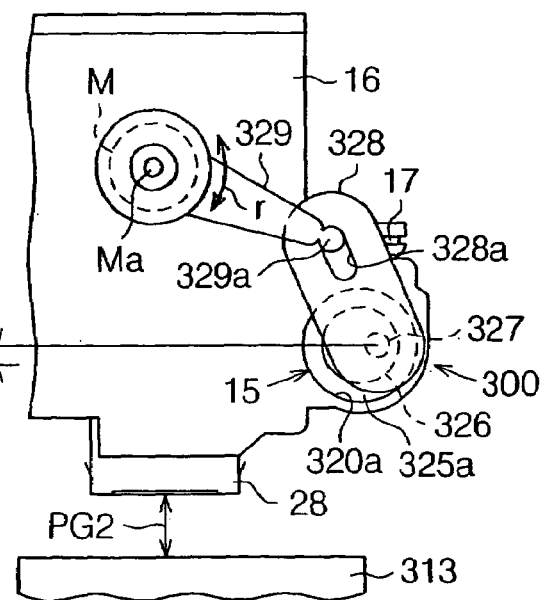
FIG. 28(b) is a side view showing a gap between the recording head moved upward from the state in FIG. 28(a) and the platen.

A support hole 320a is formed in the carriage 16 provided in the recording apparatus 311 as shown in FIGS. 28(a) and 28(b). The guide member 15 laid out in parallel to the timing belt 17 is inserted in the support hole 320a. The carriage 16 reciprocates in the direction of the arrow x via the timing belt 17 by the driving of the carriage motor 18 while being guided to the guide member 15.

Next, a guide mechanism 300 including the guide member 15 and the elevation mechanism for the guide member 15 are discussed based on FIGS. 28(a) and 28(b). FIG. 28(a) shows the carriage 16 at a lower position and FIG. 28(b) shows the carriage 16 lifted up to an upper position.

The guide mechanism 300 includes the guide member 15, an outer cylinder member 325a fixed to the support hole 320a of the carriage 16 and a center shaft 326 rotatably supported on the outer cylinder member 325a. Two eccentric shafts 327 eccentric to the axial center of the center shaft 326 are fixed to corresponding end portions of the guide member 15. Both eccentric shafts 327 are rotatably supported on the frame 12 (see FIG. 27). An actuation lever 328 is fixed to the right eccentric shaft 327. An actuation groove 328*a* is formed in the actuation lever 328.

A reversible motor M is secured to the frame 12 shown in FIG. 27. The reversible motor M is driven based on a signal from the thickness sensor or the thickness of the target T. As shown in FIGS. 28(*a*) and 28(*b*), the proximal end of an arm lever 329 is fixed to the rotary shaft, Ma, of the reversible motor M. The arm lever 329 is rotatable along the direction r. The arm lever 329 is coupled to the actuation groove 328*a* of the actuation lever 328 slidably and rotatably. As the reversible motor M is rotated to turn the arm lever 329 along the direction r, both eccentric shafts 327 rotate and the center shaft 326 fixed to the eccentric shafts 327 rotates about the eccentric shafts 327 and are lowered. As a result, the carriage 16 is elevated, changing a distance PG1, PG2 from the platen 313 to the recording head 28.

Figure 29:
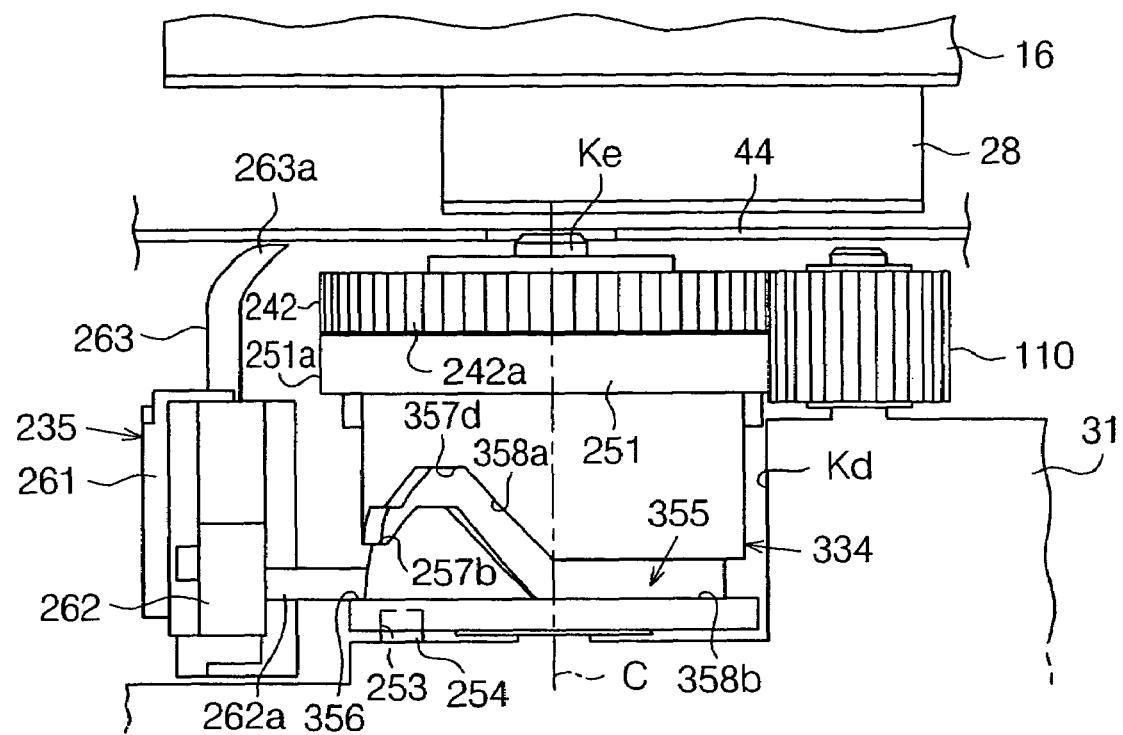
FIG. 29 is a front view of the position of non-action of a wiping member equipped in the recording apparatus in FIG. 27.
Figure 30:
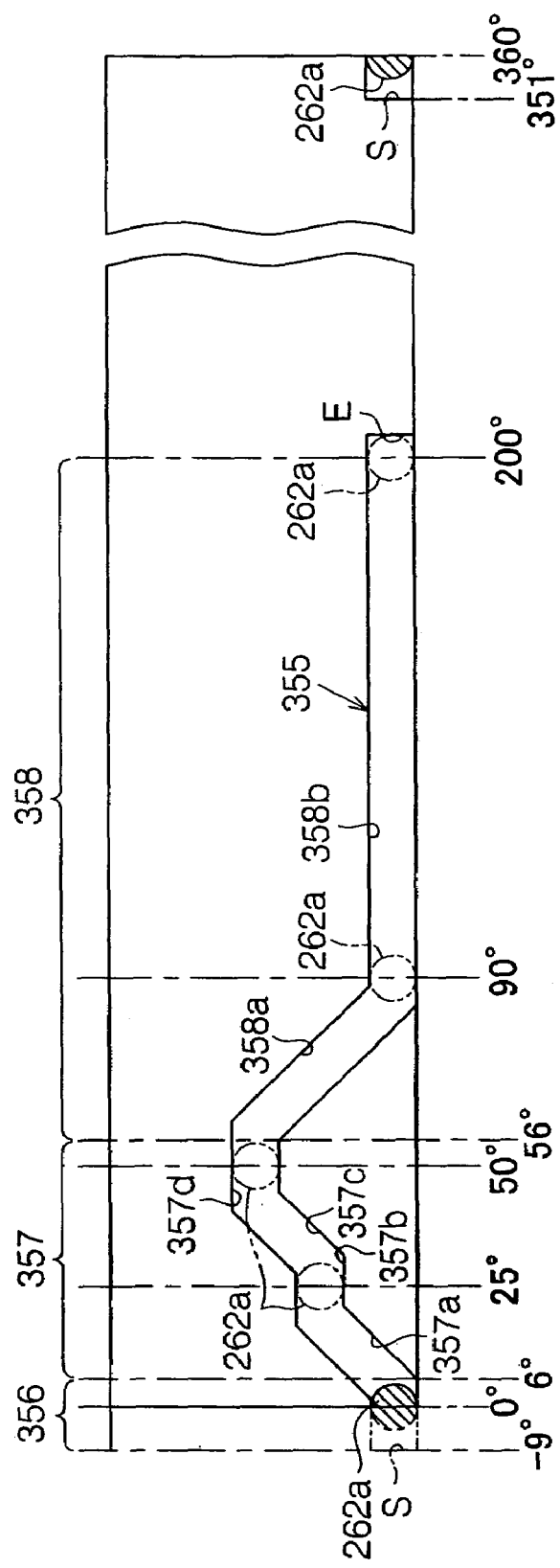
FIG. 30 is a developed view of essential portions on the circumferential surface of a cylindrical cam in FIG. 29.

As shown in FIG. 29, a cam groove 355 different in structure from the cam groove 252 of the cylindrical cam 234 in FIG. 16 is formed in the circumferential surface of the cylindrical cam 334. The cam groove 355 includes a retreat guide portion 356, an action guide portion 357 and a standby guide portion 358, as shown in FIG. 30. The retreat guide portion 356 extends along the circumferential direction at the lowermost portion of the cylindrical cam 334. The retreat guide portion 356 is formed in a range of angle, θ= about −9° to about 6°, provided that a line OC (see FIG. 21) connecting the center of the stop member 254 to the rotational axial center C of the cylindrical cam 334 is 0°, as shown in FIG. 30.

As shown in FIG. 30, the action guide portion 357 is formed in a range of angle, θ=about 6° to about 56°. The action guide portion 357 has a first inclined portion 357*a* obliquely extending upward from the retreat guide portion 356, and a first position guide portion 357*b* extending along the circumferential direction from the first inclined portion 357*a*. The first position guide portion 357*b* is at the position of the angle, θ=about 25°. Further, the action guide portion 357 has a second inclined portion 357*c* obliquely extending upward from the first position guide portion 357*b*, and a second position guide portion 357*d* extending along the circumferential direction from the second inclined portion 357*c*. The second position guide portion 357*d* is at the position of the angle, θ=about 50°. When the cylindrical cam 334 is rotated about 25° in the direction r2 (see FIG. 21) from the position shown in FIG. 30, therefore, the first position guide portion 357*b* reaches right above the stop member 254, and when the cylindrical cam 334 is rotated about 50°, the second position guide portion 357*d* reaches right above the stop member 254. That is, the action guide portion 357 has the first position guide portion 357*b* and the second position guide portion 357*d* as plural positions of action of different heights.

The standby guide portion 358 is formed in a range of angle, θ=about 56° to about 200°. As the stop member 254 abuts on the portion 253*b* of the rotation restriction groove 253 of the cylindrical cam 334, the end portion of the standby guide portion 358 is positioned. That is, the cam groove 355 is formed in approximately the same range as the range where the rotation of the cylindrical cam 334 is restricted. The standby guide portion 358 includes a standby inclined portion 358*a* obliquely extending downward from the second position guide portion 357*d* of the action guide portion 357 and a standby portion 358*b* extending along the circumferential direction from the lower end of the standby inclined portion 358*a*.

As shown in FIG. 29, when the positioning member 262*a* slides in the retreat guide portion 356 or the standby portion 358*b* of the standby guide portion 358, the positioning member 262*a* is guided to the position of non-action at the lowest position. When the positioning member 262*a* slides in the first position guide portion 357*b* of the action guide portion 357, the holding member 262 is guided to a first position of action. When the positioning member 262*a* slides in the second position guide portion 357*d*, the holding member 262 is guided to a second position of action higher than the first position of action. Further, when the positioning member 262*a* slides in the first inclined portion 357*a* of the action guide portion 357, the holding member 262 is guided to the first position guide portion 357*b* from the retreat position. When the positioning member 262*a* slides in the second inclined portion 357*c* of the action guide portion 357, the holding member 262 is guided to the second position guide portion 357*d* from the first position guide portion 357*b*. Further, when the holding member 262 slides in the standby inclined portion 358*a* of the standby guide portion 358, the holding member 262 is guided to the standby portion 358*b* of the standby guide portion 358 from the second position guide portion 357*d* of the action guide portion 357.

When the stop member 254 abuts on the end portion 253*a* of the rotation restriction groove 253 of the cylindrical cam 334 (see FIG. 21), the positioning member 262*a* is positioned at the position where it abuts on a start end portion S of the retreat guide portion 356 of the cam groove 355. In this state, the holding member 262 is positioned at the position of non-action. When the fourth gear 110 is rotated in the direction r1 from this state, the driven gear 242 and the partially toothed gear 251 rotate in the direction r2. Accordingly, the cam groove 355 of the cylindrical cam 334 rotates and the positioning member 262*a* slides to contact the standby portion 358*b* from the retreat guide portion 356 of the cam groove 355 through the first inclined portion 357*a*, the first position guide portion 357*b*, the second inclined guide portion 357*c* and the second position guide portion 357*d* of the action guide portion 357 and the standby inclined portion 358*a* of the standby guide portion 358 in that order.

When the positioning member 262*a* slides to contact the first inclined portion 357*a* of the action guide portion 357 toward the first position guide portion 357*b*, the wiper support member 261 is moved upward. When the cylindrical cam 334 is rotated about 25°, the wiper support member 261 reaches the first position of action where it slides to contact the first position guide portion 357*b*. When the positioning member 262*a* slides to contact the second inclined portion 357*c* toward the second position guide portion 357*d* from the first position guide portion 357*b*, the wiper support member 261 is moved upward. When the cylindrical cam 334 is rotated about 200°, the wiper support member 261 reaches the second position of action where it slides to contact the second position guide portion 357*d*.

When the cylindrical cam is rotated about 200° and the stop member 254 abuts on the first end portion 253*b* of the rotation restriction groove 253, the positioning member 262*a* abuts on the end portion E of the standby portion 358*b* of the standby guide portion 358 of the cam groove 355. The partially toothed gear 251 engages with the fourth gear 110 only in the range where the positioning member 262*a* moves from the retreat guide portion 356 of the cam groove 355 to the standby guide portion 358 through the action guide portion 357.

As the drive motor 38 is rotated reversely, the positioning member 262a slides to contact the retreat guide portion 356 from the standby guide portion 358 through the action guide portion 357 in reverse order to the above-described order. When the stop member 254 is rotated about 150° from the state where the stop member 254 abuts on the end portion 253b or the state where the positioning member 262a is positioned at the end portion E of the standby portion 358b, the positioning member 262a reaches the second position of action for the second position guide portion 357d. When the positioning member 262a is rotated about 175° from the state where it is positioned at the end portion E of the standby portion 358b, the positioning member 262a reaches the first position of action for the first position guide portion 357b.

Figure 31:
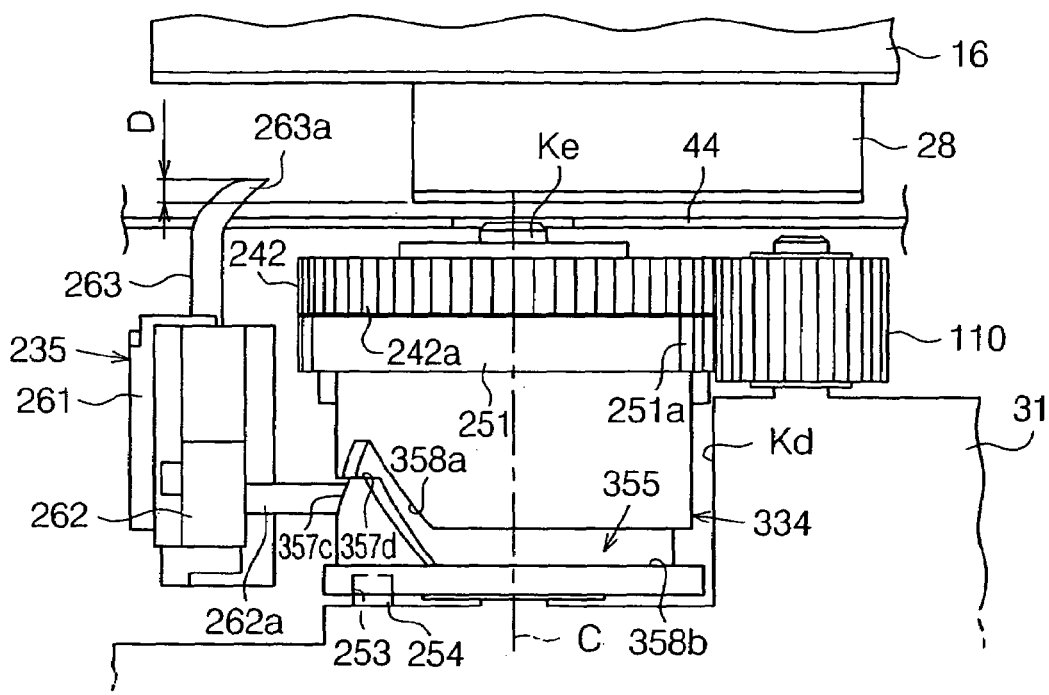
FIG. 31 is a front view of the first position of action of the wiping member in FIG. 29.
Figure 32:
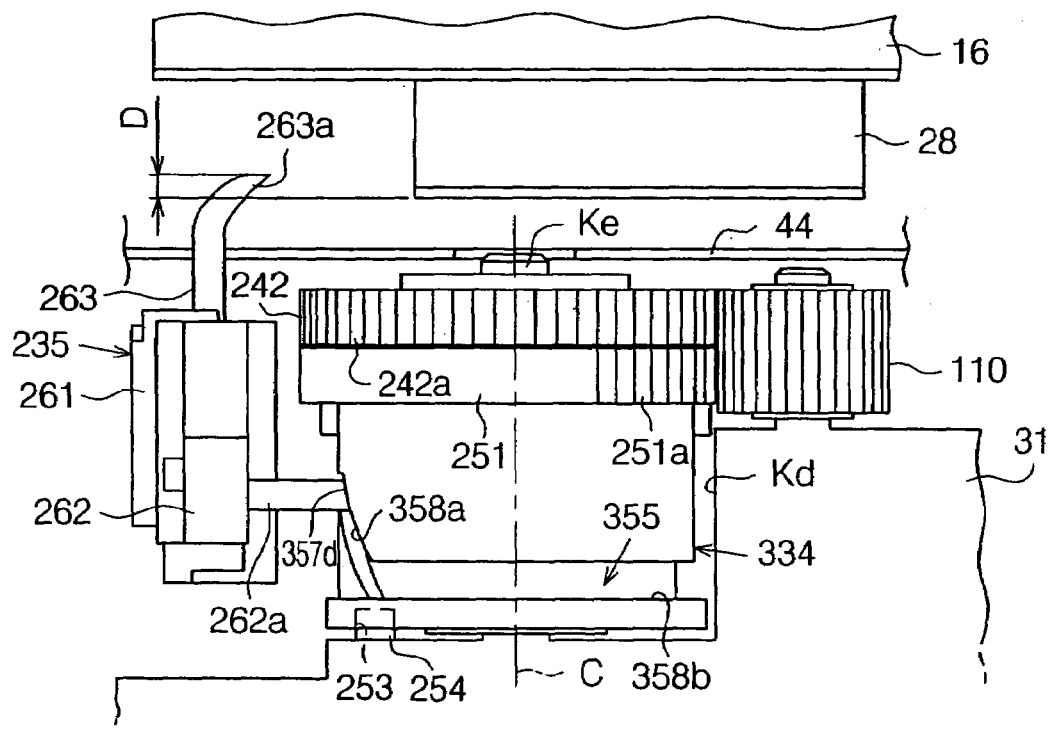
FIG. 32 is a front view of the second position of action of the wiping member in FIG. 29.

As shown in FIG. 29, when the positioning member 262a is positioned in the retreat guide portion 356, the wiping member 263 is positioned at the retreat position isolated from the recording head 28. When the positioning member 262a is positioned at the first position of action for the first position guide portion 357b (see FIG. 28(a)), the platen 313 is separated from the end face of the recording head 28 by the distance PG1. At this time, as shown in FIG. 31, the distal end 263a of the wiping member 263 is positioned above by a predetermined height D from the line that extends from the end face of the recording head 28. Further, when the positioning member 262a is positioned at the second position of action for the second position guide portion 357d (see FIG. 28(b)), the platen 313 is separated from the end face of the recording head 28 by the distance PG2. At this time, as shown in FIG. 32, the distal end 263a of the wiping member 263 is positioned above by the predetermined height D from the line that extends from the end face of the recording head 28 as in the state in FIG. 31. The wiper position adjusting means in this embodiment includes the cylindrical cam 334, the holding member 262 and the positioning member 262a.

The action of the above-described recording apparatus 311 will be described next.

When printing is carried out by the recording apparatus 311, first, the target T is led into the recording apparatus 311 by the feed motor 14. At this time, the thickness of the target T to be led is detected by the thickness sensor in the vicinity of the feed roller. Normally, the recording apparatus 311 is so set as to print on the relatively thin target T such as normal paper. In the case where the recording apparatus 311 determines that the relatively thin target T has been led, it keeps the carriage 16 at a low position as shown in FIG. 28(a) without driving the reversible motor M. That is, in this case, the recording apparatus 311 prints with the setting of the distance PG1 from the platen 313 to the recording head 28.

The recording apparatus 311 further drives the feed motor 14 to guide the target T between the platen 313 and the recording head 28. The recording apparatus 311 drives the piezoelectric element to eject inks supplied from the ink cartridges 21 and 22 toward the target T from the nozzles of the recording head 28 while reciprocating the carriage 16 along the direction x by driving the carrriage motor 18. When ejection from the recording head 28 is finished within the range where the carrriage 16 can reciprocate, the recording apparatus 311 drives the feed motor 14 to feed the target T forward by a predetermined amount. Thereafter, the recording apparatus 311 drives the carriage motor 18 and the piezoelectric element again to eject inks from the recording head 28 while moving the carrriage 16. Printing on the target T is carried out by repeating these steps.

In the case where printing is finished and the cleaning operation for the recording head 28 is to be carried out, the recording apparatus 311 drives the carriage motor 18 to move the carriage 16 in the direction x to the position facing the cap 46. At this time, the positioning member 262a of the wiper support member 261 is positioned at the retreat guide portion 356 of the cam groove 355, as shown in FIG. 29. Even if the carriage 16 passes over the wiping member 263 in the direction x, the distal end 263a of the wiping member 263 does not abut on the recording head 28 of the carriage 16. At this time, the stop member 254 abuts on the first end portion 253a of the rotation restriction groove 253 at the bottom of the cylindrical cam 234 and the tooth 251a positioned at the end portion E of the partially toothed gear 251 faces the fourth gear 110.

When the carriage 16 reaches the position facing the cap 46, the recording apparatus 311 stops driving the carriage motor 18 and rotates the drive motor 38 forward. As the drive motor 38 is rotated forward, the drive gear 38a rotates and the torque is transmitted to the fourth gear 110 via the first to third gears 107 to 109. Accordingly, the fourth gear 110 is rotated in the direction r1 and the driven gear 242 which engages with the fourth gear 110 is rotated in the direction r2. As the teeth 251a of the partially toothed gear 251 are at the position facing the fourth gear 110, the teeth 251a of the partially toothed gear 251 engage with the fourth gear 110. This causes the cylindrical cam 234 to rotate in the direction r2, rotating the cam groove 355. As a result, the positioning member 262a reaches the standby guide portion 358 from the retreat guide portion 356 of the cam groove 355 through the action guide portion 357, elevating the wiping member 263.

When the positioning member 262a reaches the standby guide portion 358 and the cylindrical cam 234 makes about a half turn, the teeth 251a of the partially toothed gear 251 do not engage with the fourth gear 110. As the driven gear 242 which slides in contact to the partially toothed gear 251 keeps rotating, however, the torque of the driven gear 242 is converted to frictional force which is transmitted to the partially toothed gear 251, further rotating the cylindrical cam 234. And, when the stop member 254 abuts on the first end portion 253b of the rotation restriction groove 253 or rotates about 200°, the rotation of the cylindrical cam 234 in the direction r2 is stopped.

The cap support member 47 is elevated by the elevation mechanism which is driven by the transmitted torque of the driven gear 242 and the cap 46 guided to the position of action tightly closes the recording head 28. Then, the tube pump 37 is driven via the third gear 109, generating negative pressure in the tightly-closed space of the recording head 28. Accordingly, high-viscosity inks, which would clog the nozzles of the recording head 28, are exhausted to the waste liquid tank 40.

When the drive motor 38 is switched to the reverse rotation thereafter, the fourth gear 110 is rotated in the direction opposite to the direction r1. Accordingly, the cylindrical cam 234 is rotated in the direction opposite to the direction r2 via the driven gear 242. When the positioning member 262a reaches the action guide portion 357 from the standby guide portion 358 thereafter, the partially toothed gear 251 engages with the fourth gear 110 also. When the cylindrical cam 234 is rotated about 175° in the direction opposite to the direction r2 from the end portion E of the standby portion 358b of the standby guide portion 358, the drive motor 38 is stopped. Before the drive motor 38 is stopped, the partially toothed gear 251 engages with the fourth gear 110 and further the positioning member 262a reaches the first position guide portion 357b through the second position guide portion 357d and the second inclined guide portion 357c of the cam groove 355.

When the cylindrical cam 234 is stopped at the position of 25° rotation since the beginning of cleaning, as shown in FIG. 31, the positioning member 262a is positioned at the standby guide portion 358. Accordingly, the wiping member 263 is placed at the first position of action. This causes the distal end of the wiping member 263 to be positioned above the recording head 28 by the predetermined height D.

The cap support member 47 is lowered by the elevation mechanism and the cap 46 is positioned at the position of non-action so that the carriage 16 becomes movable. The recording apparatus 311 drives the carriage motor 18 to move the carriage 16 in the direction of the arrow x from above the cap 46. Then, the carriage 16 abuts on the wiping member 263 and moves in the direction opposite to the direction x, so that the wiping member 263 is bent by the moving carriage 16 and its distal end 263a abuts on the recording head 28. The further movement of the carriage 16 causes the wiping member 263 to move with respect to the recording head 28 and perform wipe and cleaning to wipe off the entire surface of the recording head 28.

When cleaning of the recording head 28 by the wiping member 263 is finished, the recording apparatus 311 reversely rotates the drive motor 38 again. Therefore, the fourth gear 110 is rotated in the direction opposite to the direction r1 again so that the driven gear 242 and the partially toothed gear 251 rotate in the direction opposite to the direction r2. Therefore, the cylindrical cam 234 rotates in the direction opposite to the direction r2. Accordingly, the positioning member 262a reaches the retreat guide portion 356 through the first inclined portion 357a of the action guide portion 357. As the cylindrical cam 234 is rotated to the position at which cleaning starts (see FIG. 21), the stop member 254 abuts on the first end portion 253a of the rotation restriction groove 253. This restricts the rotation of the cylindrical cam 234 so that the cylindrical cam 234 stops rotating in the direction opposite to the direction r1 and stops. Thereafter, the rotation of the drive motor 38 is stopped.

Next, a case where printing is done on the thick target T such as a CD-ROM in place of normal paper will be described. When the target T is led by the feed motor 14, the thickness sensor in the recording apparatus 311 detects the thickness of the target. When the recording apparatus 311 determines that the target is thicker than a predetermined value, the recording apparatus 311 drives the reversible motor M to rotate the arm lever 329. Accordingly, the carriage 16 comes to the state in FIG. 28(b) where it is lifted by a height H from the state in FIG. 28(a). That is, the distance PG1 from the platen 313 to the recording head 28 is changed to the distance PG2 greater than the distance PG1.

Thereafter, at the time the drive motor 38 is rotated forward and then rotated reversely in the cleaning operation, the carriage 16 is at an upper position, so that the drive motor 38 temporarily stops after being rotated 150°, not 175°, from the end wall of the standby portion 358b of the standby guide portion 358. That is, it temporarily stops in a state where it is rotated by the angle, θ=50° (see FIG. 21).

As shown in FIG. 32, the positioning member 262a is positioned at the second position guide portion 357d of the cam groove 355, the holding member 262 is guided to the second position of action and the end face of the distal end 263a of the wiping member 263 projects out from the line extending from the end face of the recording head 28 by the predetermined height D. Even when the distance PG1 (see FIG. 28(a)) from the platen 313 to the recording head 28 is changed to the distance PG2 (see FIG. 28(b)), therefore, a distance D from the end face of the distal end 263a of the wiping member 263 to the recording head 28 is always constant and the wiping member 263 performs wiping and cleaning in this state.

If the thin target T is led to the recording apparatus 311 to perform printing on the target T, the thickness is detected by the thickness sensor and the reversible motor M coupled to the arm lever 329 is rotated reversely. Accordingly, the recording head 28 is lowered to the position shown in FIG. 28(a) from the position shown in FIG. 28(b). In the case where cleaning is carried out in this state, the drive motor 38 rotated forward temporarily stops in the state where it is rotated 175° from the end wall of the standby portion 358b. With the distal end 263a of the wiping member 263 always positioned above the end face of the recording head 28 by the predetermined height D, the wiping member 263 wipes the recording head 28 clear.

The present embodiment has the following advantages.

As shown in FIGS. 28(a) and 28(b), the elevation position of the wiping member 263 is changed according to the distance PG1, PG2 from the platen 313 to the end face of the recording head 28. Even when the recording head 28 is elevated and the distance PG1, PG2 is changed, however, the distal end 263a of the wiping member 263 is always placed above the end face of the recording head 28 by the same height D. This can make the interference portion of the wiping member 263 with respect to the recording head 28 constant, so that the wiping member 263 can always adequately wipe the recording head 28 clear. Therefore, the recording head 28 can always eject inks that are in a good condition.

The positioning member 262a which is guided in the up and down direction as it slides in the cam groove 355 formed in the cylindrical cam 234 is coupled to the holding member 262 which supports the wiping member 263. Accordingly, as the cylindrical cam 234 rotates, the positioning member 262a slides in the cam groove 355, elevating the wiping member 263. The position of the wiping member 263 can therefore be adjusted easily with a simple structure.

As shown in FIGS. 28(a) and 28(b), each distance PG1, PG2 from the platen 313 to the recording head 28 is adjusted by elevating the recording head 28. That is, because the carriage 16 alone is elevated, each distance PG1, PG2 from the platen 313 to the recording head 28 can be adjusted easily without applying a large load.

The cam groove 355 has the retreat guide portion 356 which does not abut on the carriage 16 even if the carriage 16 passes above, the first position guide portion 357b at which the holding member 262 is set at the first position of action and the second position guide portion 357d at which the holding member 262 is set at the second position of action. With the positioning member 262a positioned at the retreat guide portion 356 and the wiping member 263 at the retreat position isolated from the recording head 28, the recording head 28 passes over the wiping member 263, so that the wiping member 263 does not receive force from the recording head 28. Accordingly, unnecessary force is not applied to the wiping member 263, thus making it possible to extend its life.

The cam groove 355 has the horizontal portion where the first position guide portion 357b and the second position guide portion 357d are formed on the circumferential surface of the cylindrical cam 234. That is, the first and second position guide portions 357b and 357d for positioning the wiping member 263 are the horizontal portion of a predetermined length. Even if there is an error in the rotational angle at which the cylindrical cam 234 temporarily stops, therefore, the position of the wiping member 263 is elevated to a predetermined height. That is, the wiping member 263 can be adjusted to a predetermined position even if the rotation of the cylindrical cam 234 is not strictly controlled to stop.

Only the wiping apparatus 235 which is a part of the nozzle protecting device 30 is elevated based on each distance PG1, PG2. This makes it possible to easily elevate the wiping member 263 with a smaller load as compared with elevation of the entire nozzle protecting device 30.

As the recording apparatus 311 automatically discriminates the thickness of the target T to be led out, each distance PG1, PG2 from the platen 313 to the recording head 28 as well as the position of the wiping member 263 is adjusted. This can allow the wiping member 263 to adequately wipe the recording head 28 clear and can make it unnecessary to adjust the distance PG1, PG2 on the user side, so that inks can be ejected to the target T more adequately.

Figure 33:
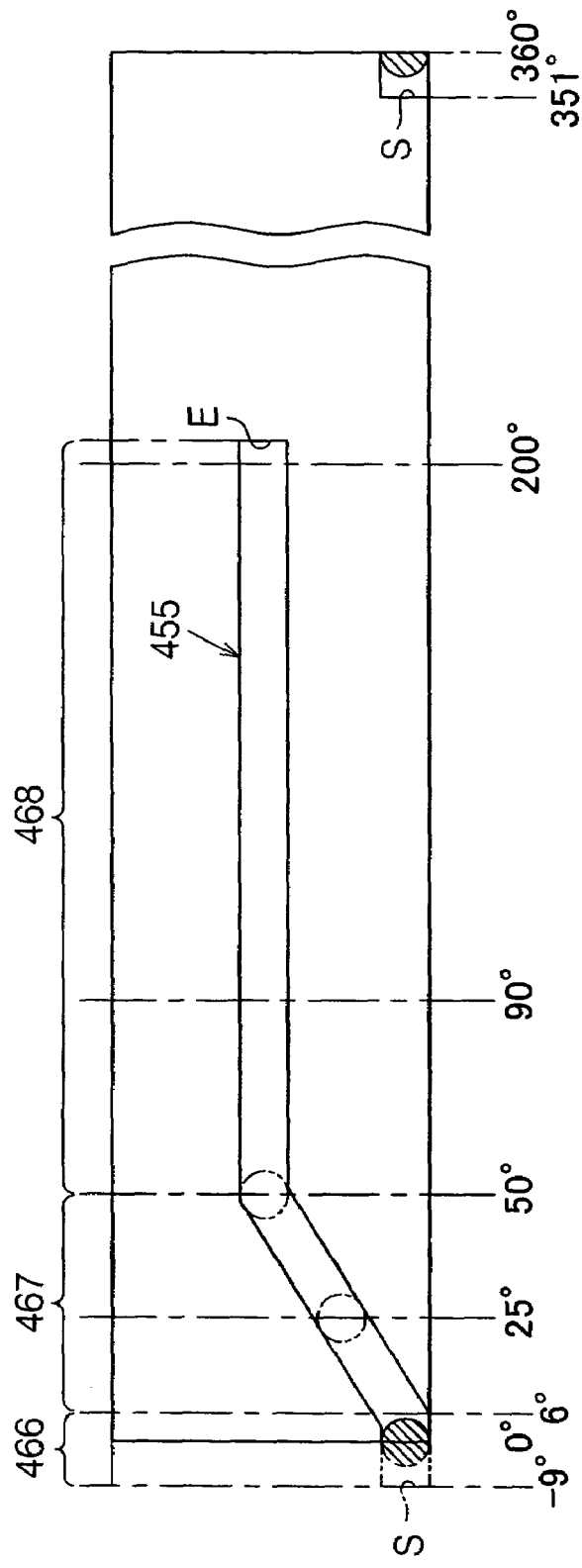
FIG. 33 is a developed view of the side of a cylindrical cam according to a sixth embodiment of the present invention.

Next, a sixth embodiment of the present invention will be described based on FIG. 33. This embodiment differs from the embodiment in FIGS. 27 to 32 only in the shape of the cam groove 355 and the same symbols as with the embodiment in FIGS. 27 to 32 are used with similar portions and their detailed descriptions are omitted.

A cam groove 455 in this embodiment has a retreat guide portion 466 positioned below the cylindrical cam 234, an action guide portion 467 obliquely extending upward from the retreat guide portion 466 and a standby guide portion 468 extending along the circumferential direction from the action guide portion 467. The action guide portion 467 is straight. The action guide portion 467 becomes the same height as the first position guide portion 357b in FIG. 30 when rotated by an angle, θ=25° and becomes the same height as the second position guide portion 357d in FIG. 30 when rotated by 50°. That is, if the drive motor 38 is temporarily stopped at a rotational angle similar to that in the embodiment in FIGS. 27 to 32 when the drive motor 38 rotates reversely, the holding member 262 is placed at the first position of action or the second position of action via the positioning member 262a inserted in the cam groove 455. In the present embodiment, the standby guide portion 468 is formed at an upper position. When the positioning member 262a is positioned at the standby guide portion 468, the carriage 16 moves to the position facing the cap 46 and does not pass over the wiping member 263 so that the wiping member 263 is not subjected to force from the recording head 28.

The present embodiment has the following advantages below in addition to the advantages, such as the recording head always ejecting inks or easy adjustment of the position of the wiper member.

The cam groove 455 includes the retreat guide portion 466 extending in the circumferential direction, and the standby guide portion 468 and the action guide portion 467, which connects them in a straight line. That is, because the cam groove 455 has a simpler shape as compared with the cam groove 355 in the embodiment in FIGS. 27 to 32, the cam groove 455 can be formed easily.

The action guide portion 467 which determines the position of action of the positioning member 262a is inclined to be straight. This makes it possible to easily adjust the position at which the cylindrical cam 234 temporarily stops or the rotational angle of the drive motor 38 at the time the wiping member 263 wipes the recording head 28 clean. Therefore, the optimal position at which the wiping member 263 wipes the recording head 28 clean can be acquired merely by a simple operation of delicately adjusting the rotational angle of the drive motor 38.

The above-described embodiments of the present invention may be modified as follows.

In the embodiment in FIGS. 1 to 11, if the inside of the cap 46 can be opened to and blocked from air by changing the relative distance between the cap 46 and the cap support member 47, other air release means may be used as well.

In the embodiments in FIGS. 1 to 15, the valve body 58, 126 may also be formed of a flexible material. The valve body 58, 126 may alone be formed of a flexible material. Further, both the valve seat 56, 123 and the valve body 58, 126 may be formed of a material other than a flexible material.

In the embodiment in FIGS. 1 to 11, if the valve seat 56 and the valve body 58 can abut on and part from each other by changing the relative distance between the cap 46 and the cap support member 47, the valve seat 56 and the valve body 58 may be provided on other walls of the cap 46.

In the embodiment in FIGS. 1 to 11, the valve body 58 may be urged in a direction to abut on the valve seat 56 by the spring member 58a and other urging means. The valve seat 56 and the valve body 58 may be made to abut on each other without using the spring member 58a but by other means. In the embodiment in FIGS. 12 to 15, likewise, the valve body 126 may be urged in a direction to abut on the valve seat 123 by the spring member 125 and other urging means. The valve seat 123 and the valve body 126 may be made to abut on each other without using the spring member 125 but by other means.

In the embodiment in FIGS. 1 to 11, when the relative distance between the cap support member 47 and the cap 46 is maximum, the lever 73 may be positioned within the movable range of the plate 61 or above the plate 61. As a result, when the lever 73 is lifted upward, the plate 61 is positioned under the lever 73 so that the plate 61 does not interfere with the elevation of the lever 73. Because it is unnecessary to slide the lever 73 to lift the lever 73 upward, the apparatus can be simplified.

In the embodiment in FIGS. 1 to 11, for example, the contact surfaces of the plate 61 and the lever 73 may be set curved surfaces so that the lever 73 slides.

In the embodiment in FIGS. 1 to 11, the lever 73 may be urged in the slide direction by the spring member 77 and other urging means.

In the individual embodiments in FIGS. 1 to 15, if the cap support member 47, 121 can be moved up and down, the drive force from the drive motor 38 may be transmitted via other transmission means in place of the cylindrical cam 35.

In the individual embodiments in FIGS. 1 to 15, the cylindrical cam 35 is not restrictive, but other cams, e.g., a spherical cam, a conical cam, a flat-plate cam or the like, may be used.

In the individual embodiments in FIGS. 1 to 15, instead of transmitting the drive force from the drive motor 38 to the cylindrical cam 35 and the tube pump 37 with a predetermined phase difference, they may be driven by separate drive means respectively.

In the individual embodiments in FIGS. 1 to 15, the liquid ejection apparatus may be an apparatus which ejects other liquids as well as a printing apparatus including a facsimile or a copying machine. For example, it may be a liquid ejection apparatus, which ejects liquids for the electrode materials or color materials to be used in manufacturing a liquid crystal display, an EL display, a surface emission display (FED) or the like, a liquid ejection apparatus, which ejects a living organic material to be used in a bio chip, or a sample ejection apparatus, such as a fine pipette.

In the embodiment in FIGS. 12 to 15, other air release means may be used if the inside of the cap 120 can be opened and closed to air by changing the distance between the cap support member 121 and the partition 133.

In the embodiment in FIGS. 12 to 15, the air tube 122 may be attached to the other wall of the cap support member 121 other than by that which lies on the third retaining portion 43 side and further, the valve body 126 may likewise be attached to the same wall in such a way as to rotatably abut on the valve seat 123. Accordingly, the partition 133 should be provided in such a way that its abutment portion 134 abuts on the projection 129 of the valve body 126.

In the embodiment in FIGS. 12 to 15, air in the cap 120 has only to be non-released by causing the valve body 126 to abut on the opening of the valve seat 123. In the case where the opening of the valve seat 123 is on the left-hand side, for example, the valve body 126 may be provided to the left to the opening, and in the case where the opening of the valve seat 123 is on the upper side, the valve body 126 may be provided on the upper side. At this time, the position of the abutment portion 134 may be changed adequately.

In the embodiment in FIGS. 16 to 23, for example, the cam groove 252 may be formed in the cylindrical cam 234 and the two members, the first groove-forming member 255 and the second groove-forming member 256, may be formed by a single member.

In the individual embodiments in FIGS. 16 to 33, the partially toothed gear 251 may be provided on a portion other than the upper side of the cylindrical cam 234, e.g., on the lower side.

In the individual embodiments in FIGS. 16 to 33, the gap at the time the projection portions 260 of the partially toothed gear 251 are inserted in the recess portions 259 of the second groove-forming member 256 may be set to other than one pitch. If the gap is smaller than one pitch, engagement can be done more smoothly than in the prior art and the rotational loss with respect to the cylindrical cam 234 of the partially toothed gear 251 can be reduced.

In the individual embodiments in FIGS. 16 to 33, recess portions may be formed in the partially toothed gear 251 and projection portions which are fitted in the recess portions may be formed on the second groove-forming member 256.

In the individual embodiments in FIGS. 16 to 33, the diameters of the partially toothed gear 251 and the driven gear 242 may differ from each other. In this case, with regard to the lower side of the fourth gear 110 with which the partially toothed gear 251 engages and the upper side of the fourth gear 110 with which the driven gear 242 engage, two gears of different diameters may be aligned with each other and placed as the fourth gear 110.

In the individual embodiments in FIGS. 16 to 33, the partially toothed gear 251, the fourth gear 110 and the driven gear 242 may be constituted by a gear other than a spur gear, for example, a helical gear.

In the individual embodiments in FIGS. 16 to 33, the cylindrical cam 234, 334 provided on the partially toothed gear 251 may be used in a mechanism other than the one which elevates the wiping member 263. For example, the cylindrical cam 234, 334 may be used in an unillustrated mechanism which elevates the cap support member 47 so that the cap 46 is elevated by rotating the cylindrical cam 234, 334.

In the individual embodiments in FIGS. 27 to 33, the second position of action may be provided at a position close to the retreat guide portion 356 which becomes the lowest portion at the time cleaning starts, and the first position of action lower than the second position of action may be provided at a position close to the standby guide portion 358.

In the embodiment in FIGS. 27 to 32, more position guide portions 357b, 357d which become the horizontal portions of the action guide portion 357 may be provided. In the embodiment in FIG. 33, the timing of stopping the drive motor 38 when rotated reversely may be adjusted accurately. This can allow the wiping member 263 to always project from the end face of the recording head 28 by the predetermined height D even when the distance PG1 (PG2) between the platen 313 and the recording head 28 is continuously adjustable.

In the individual embodiments in FIGS. 27 to 33, each distance PG1, PG2 may be changed by elevation of the platen 313 instead of the recording head 28.

In the individual embodiments in FIGS. 27 to 33, each standby guide portion 358, 468 of the cam groove 355, 455 may be changed. As the positioning member 262a slides when the recording head 28 faces the cap 46, both standby guide portions 358 and 468 do not receive force from the recording head 28 regardless of the height of the wiping member 263.

The invention claimed is:

1. A liquid ejection apparatus comprising:
    a liquid ejection head including nozzles, a cap, a cap support member which supports said cap, and drive means for driving said cap support member to move said cap toward the liquid ejection head and cover nozzles of said liquid ejection head with said cap;
    elastic means which is intervened between said cap support member and said cap and said elastic means stretches for changing a distance between said cap support member and said cap with said cap covering said nozzles; and
    air release means for opening and closing the inside of said cap with respect to air with said cap covering said nozzles in accordance with a change in said distance.

2. The liquid ejection apparatus according to claim 1, further comprising a cam, where said cap support member is moved via the cam by said drive means.

3. The liquid ejection apparatus according to claim 2, further comprising suction means for sucking a fluid from inside said cap, wherein said drive means drives said suction means with a predetermined phase difference with respect to said cam.

4. A liquid ejection apparatus comprising:
    a liquid ejection head including nozzles, a cap, a cap support member which supports said cap, and drive means for driving said cap support member to move said cap toward the liquid ejection head and cover nozzles of said liquid ejection head with said cap;
    elastic means which is intervened between said cap support member and said cap for changing a distance between said cap support member and said cap by said elastic means stretching; and
    air release means for opening and closing the inside of said cap covering said nozzles with respect to air in accordance with a change in said distance,
    wherein said air release means includes:
    a through hole penetrating a wall of said cap;
    a valve seat provided integrally with said cap in such a way as to be positioned at an end portion of said through hole;

a valve body provided integrally with said cap; and a pressing member which is provided on said cap support member and presses said valve body in accordance with a change in said distance between said cap support member and said cap, and pressure from said pressing member causes said valve body to move and selectively abut on and part from said valve seat, so that the inside of said cap is opened and closed with respect to air via said through hole.

5. The liquid ejection apparatus according to claim 4, wherein said valve seat is formed of a flexible material.

6. The liquid ejection apparatus according to claim 4, wherein said valve body is formed of a flexible material.

7. The liquid ejection apparatus according claim 4, wherein said valve seat is provided at a lower side of said cap, said valve body is provided under said valve seat at a normal position, said valve body abuts on said valve seat to close said through hole when moving above said normal position, said valve body parts from said valve seat to open said through hole when moving below said normal position, said pressing member is positioned above said valve body when said distance between said cap support member and said cap is closest, and said pressing member presses said valve body downward from above when said distance between said cap support member and said cap increases.

8. The liquid ejection apparatus according to claim 7, wherein said valve body includes urging means for urging said valve body in a direction to abut on said valve seat.

9. The liquid ejection apparatus according to claim 7, wherein said valve body is rotatable with respect to said cap, and said pressing member is positioned outside a movable range of said valve body when said distance between said cap support member and said cap is a maximum.

10. The liquid ejection apparatus according to claim 9, wherein an inclined surface inclined relative to a movement direction of said cap support member is formed on a bottom side of said valve body and a top side of said pressing member.

11. The liquid ejection apparatus according to claim 7, wherein said pressing member is supported on said cap support member in such a way as to be slidable in a direction orthogonal to an opening or closing direction of said valve body.

12. The liquid ejection apparatus according to claim 11, wherein said pressing member includes urging means for urging said pressing member in said slide direction.

13. A liquid ejection apparatus comprising:
a liquid ejection head including nozzles, a cap, a cap support member which supports said cap, and drive means for driving said cap support member to move said cap toward the liquid ejection head and cover nozzles of said liquid ejection head with said cap;

elastic means which is intervened between said cap support member and said cap for changing a distance between said cap support member and said cap by said elastic means stretching; and air release means for opening and closing the inside of said cap covering said nozzles with respect to air in accordance with a change in said distance, wherein said air release means includes:

a through hole penetrating a wall of said cap;

a tube to be coupled to said through hole and having a distal end and a proximal end which is supported on said cap support member;

a valve seat provided at said tube;

a valve body provided at said cap support member;

a retaining portion which retains said cap support member; and a pressing member which is provided in said retaining portion and presses said valve body in accordance with a change in said distance between said cap support member and said cap, and pressure from said pressing member causes said valve body to move and selectively abut on and part from said valve seat, so that the inside of said cap is opened and closed with respect to air via said through hole.

14. The liquid ejection apparatus according to claim 13, wherein said valve seat is formed of a flexible material.

15. The liquid ejection apparatus according claim 14, further comprising urging means for urging said valve body in a direction to abut on said valve seat.

16. The liquid ejection apparatus according to claim 14, wherein said valve body is rotatable with respect to said cap support member, and said pressing member is positioned outside a movable range of said projection of said valve body when said distance between said cap support member and said cap is a maximum.

17. The liquid ejection apparatus according to claim 13, wherein said valve body is formed of a flexible material.

18. The liquid ejection apparatus according to claim 13, wherein said valve body has a projection abuttable on said pressing member, said through hole is closed when said valve body abuts on said valve seat, said through hole is opened when said valve body parts from said valve seat, said pressing member is positioned below said valve body when said distance between said cap support member and said cap is closest, and said pressing member presses said projection of said valve body upward from below to move said valve body in a direction opposite to said valve seat when said distance between said cap support member and said cap increases.

* * * * *